US007568232B2

(12) United States Patent
Mitomo et al.

(10) Patent No.: US 7,568,232 B2
(45) Date of Patent: Jul. 28, 2009

(54) MALICIOUS ACCESS-DETECTING APPARATUS, MALICIOUS ACCESS-DETECTING METHOD, MALICIOUS ACCESS-DETECTING PROGRAM, AND DISTRIBUTED DENIAL-OF-SERVICE ATTACK-DETECTING APPARATUS

(75) Inventors: Masashi Mitomo, Kawasaki (JP); Yoshiki Higashikado, Kawasaki (JP); Fumie Takizawa, Kawasaki (JP); Satoru Torii, Kawasaki (JP); Osamu Koyano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 715 days.

(21) Appl. No.: 11/042,353

(22) Filed: Jan. 26, 2005

(65) Prior Publication Data

US 2005/0289649 A1 Dec. 29, 2005

(30) Foreign Application Priority Data

May 27, 2004 (JP) ............................... 2004-157374

(51) Int. Cl.
*G06F 11/00* (2006.01)

(52) U.S. Cl. ............................... 726/25; 726/22; 726/23

(58) Field of Classification Search .................... 726/23, 726/22, 25
See application file for complete search history.

(56) References Cited

FOREIGN PATENT DOCUMENTS

| JP | 2004-280724 | 10/2004 |
| JP | 2004-302956 | 10/2004 |

OTHER PUBLICATIONS

Chen and Heidemann, Detecting Early Worm Propagation through Packet Matching, Feb. 2004.*
Spafford, A Failure to Learn from the Past, printed year 2008.*
Utilizing Network Features for Privacy Violation Detection Bhattacharya, J.; Dass, R.; Kapoor, V.; Gupta, S.K.; Communication System Software and Middleware, 2006. Comsware 2006. First International Conference on 0-0 0 pp. 1-10.*
Towards a specification scheme for context-aware security policies for networked appliances Watanabe, T.; Yamada, K.; Nagatou, N.; Software Technologies for Future Embedded Systems, 2003. IEEE Workshop on May 15-16, 2003 pp. 65-68.*
Detecting packet-dropping faults in mobile ad-hoc networks Medidi, S.R.; Muralidhar Medidi; Sireesh Gavini; Signals, Systems and Computers, 2003. Conference Record of the Thirty-Seventh Asilomar Conference on vol. 2, Nov. 9-12, 2003 pp. 1708-1712 vol. 2.*

(Continued)

*Primary Examiner*—David Y Jung
(74) *Attorney, Agent, or Firm*—Fujitsu Patent Center

(57) ABSTRACT

A malicious access-detecting apparatus which is cable of grasping the whole aspect of an attack which can occur, before it actually occurs. A monitoring information-collecting section collects monitoring information including the network events detected by the monitoring devices on networks. A malicious apparatus group-deriving section retrieves a corresponding piece of the event information from an event information storage device, and derives, based on the retrieved piece of the event information, apparatuses that are involved in relevant detected network events which belong to the predetermined type of network events and of which addresses of senders or recipients are same, as a malicious apparatus group involved in the predetermined type of malicious access. A storage section stores information on each derived malicious apparatus group. An output section outputs a list of the each derived malicious apparatus group.

18 Claims, 19 Drawing Sheets

OTHER PUBLICATIONS

Patent Abstracts of Japan, Publication No. 2003-289337, Published Oct. 10, 2003.
Patent Abstracts of Japan, Publication No. 2004-280724, Published Oct. 7, 2004.
Patent Abstracts of Japan, Publication No. 2004-302956, Published Oct. 28, 2004.
Patent Abstracts of Japan, Publication No. 2005-136526, Published May 26, 2005.
Patent Abstracts of Japan, Publication No. 2005-252808, Published Sep. 15, 2005.

* cited by examiner

FIG. 9

310 EVENT INFORMATION DB

| TYPE OF TOOL | TYPE OF EVENT | ROLE OF SENDER | ROLE OF RECIPIENT | ASSOCIATING KEY |
|---|---|---|---|---|
| Trinoo | trinoo handler deploy | ATTACKER | HANDLER | ATTACKER |
| | trinoo agent deploy | ATTACKER | AGENT | ATTACKER |
| | trinoo agent start msg | AGENT | HANDLER | AGENT |
| ... | | | | |
| Stacheldraht | stacheldraht handler deploy | ATTACKER | HANDLER | ATTACKER |
| ... | | | | |

240 MONITORING LOG

| DETECTION TIME AND DATE | DETECTED EVENT NAME | SENDER ADDRESS | RECIPIENT ADDRESS |
|---|---|---|---|
| 2004/04/23 16:32:09 | Trinoo agent deploy | xxx.10.20.30 | xxx.30.40.50 |
| 2004/04/23 16:32:42 | Telnet login failed | xxx.100.60.90 | xxx.30.90.70 |
| 2004/04/23 16:33:55 | IMAP exploit overflow | xxx.170.40.200 | xxx.160.100.180 |
| ... | | | |
| 2004/04/23 19:05:47 | Trinoo agent deploy | xxx.10.20.30 | xxx.80.70.60 |
| 2004/04/23 19:06:29 | ATTACK RESPONSES http dir listing | xxx.40.3.10 | xxx.190.20.240 |
| ... | | | |
| 2004/04/24 01:54:16 | Trinoo agent deploy | xxx.10.20.30 | xxx.100.1.10 |
| 2004/04/24 01:54:01 | Backdoor subseven 22 | xxx.90.50.140 | xxx.140.10.60 |
| ... | | | |

320 DDoS NETWORK DB

| TOOL TYPE | ATTACKER | HANDLER | AGENT |
|---|---|---|---|
| Trinoo | xxx.10.20.30 | xxx.20.30.40 | xxx.30.40.50 |
| | | xxx.90.80.70 | xxx.80.70.60 |
| | | | xxx.100.1.10 |
| | | | xxx.1.10.100 |
| | | | xxx.10.100.1 |
| Stacheldraht | xxx.11.22.33 | xxx.22.33.44 | xxx.33.44.55 |
| Trinoo | xxx.14.25.35 | xxx.25.35.45 | xxx.35.45.55 |

FIG. 11

361 ATTACKING POWER INFORMATION DB

| TYPE OF TOOL | TYPE OF ATTACK | ATTACKING POWER |
|---|---|---|
| Trinoo | UDP flood | 12M bps |
| Stacheldraht | UDP flood | 15M bps |
|  | SYN flood | 8M bps |
|  | ICMP flood | 10M bps |
| ... |  |  |

FIG. 16

MALICIOUS ACCESS-DETECTING APPARATUS, MALICIOUS ACCESS-DETECTING METHOD, MALICIOUS ACCESS-DETECTING PROGRAM, AND DISTRIBUTED DENIAL-OF-SERVICE ATTACK-DETECTING APPARATUS

CROSS-REFERENCE TO RELATED APPLICATIONS

This application is based upon and claims the benefits of priority from the prior Japanese Patent Application No. 2004-157374, filed on May 27, 2004, the entire contents of which are incorporated herein by reference.

BACKGROUND OF THE INVENTION

1. Field of the Invention

The present invention relates to a malicious access-detecting apparatus, a malicious access-detecting method, a malicious access-detecting program, and a distributed denial-of-service attack-detecting apparatus, and more particularly to a malicious access-detecting apparatus, a malicious access-detecting method, and a malicious access-detecting program, for detecting malicious access before it causes a network problem, and a distributed denial-of-service attack-detecting apparatus for detecting a distributed denial-of-service attack before it actually starts an attack.

2. Description of the Related Art

With the recent development of information communication technology, services has come to be widely provided via the Internet. For example, service providers set up servers accessible via the Internet for providing various services to clients connected to the servers via the Internet. Since the servers providing services are accessible via the Internet, they are often become targets of an attack through unauthorized or malicious access. Therefore, it is a necessary technique to detect malicious access in early timing before the attack occurs.

Basically, it is possible to detect unauthorized or malicious access by detecting an access request which includes a command for a malicious purpose. However, some types of malicious access carry out an attack using a combination of a plurality of regular commands. The malicious access of this kind cannot be detected only by monitoring individual packets.

Particularly, there have been occurring distributed denial-of-service (hereinafter also referred to as "DDoS") attacks on lots of web sites for several years.

The DDoS attack section an attack performed by sending a large amount of packets to one target server from a plurality of stepping stones (apparatuses which are compromised via the Internet by a malicious user). The target server attacked by DDoS is overloaded by a flood of packets simultaneously received, and in the worst case, the server is compelled to stop its functions.

However, the packets sent by the above-mentioned attack are regular or normal packets, and therefore the DDoS attack cannot be detected only by the monitoring of individual packets. Further, since the DDoS attack is executed via the stepping stones, it is difficult to identify a site terminal used by an attacking person, and therefore difficult to work out a countermeasure against the attack.

To overcome the problem, there has been employed a method of detecting and blocking the malicious access by causing a plurality of border routers to calculate the number of packets having the same recipient and exchange results of the calculations between the border routers to thereby monitor packets flowing in via the border routers, determining that an abnormally large number of packets flowing in to the same address are produced for a DDoS attack, and suppressing the flow-in of packets (see e.g. Japanese Unexamined Patent Publication (Kokai) No. 2003-289337 (paragraph numbers [0031] to [0047], and FIG. 1).

However, the conventional malicious access-detecting method has the problem that it is difficult to predict the whole aspect of malicious access, particularly an attack threatened to occur in the future. More specifically, while the conventional malicious access-detecting method detects malicious access by monitoring individual packets, it is impossible to grasp the whole aspect of malicious access which is executed by malicious apparatuses formed by the stepping stones, as in the DDoS attack representing this type of malicious access. This makes it impossible to predict the scale of attack and that of resulting damage, and difficult to provide an effective countermeasure.

Particularly, the scale of a DDoS attack is increased as the number of stepping stones is increased. Therefore, if the whole aspect of a possible attack can be known before the start of an actual attack, it is possible to take an effective countermeasure. However, it is impossible to grasp the whole aspect of an attack through detection of malicious access by the conventional method, and therefore the scale of the attack and that of the resulting damage cannot be predicted, which makes it impossible to take an effective countermeasure.

Further, in the conventional method of detecting a DDoS attack, packets produced by the DDoS attack are counted and the total of counts of packets is calculated, whereby the DDoS attack currently underway can be detected. This section that at a time point the DDoS attack is detected, the final stage, i.e. attack itself of the DDoS attack has already been started, and a flood of packets are flowing into the network. Therefore, even if the packets flowing in are suppressed at this time point, damage, such as delayed transmission of normal packets, has already been caused. Further, once an attack by the malicious access has been started, it is difficult to take an effective counter measure.

SUMMARY OF THE INVENTION

The present invention has been made in view of the above described points, and an object thereof is to provide a malicious access-detecting apparatus, a malicious access-detecting method, and a malicious access-detecting program, which make it possible to grasp the whole aspect of malicious access before it cause a network problem. Another object of the present invention is to provide a distributed denial-of-service attack-detecting apparatus which makes it possible to grasp the whole aspect of a distributed denial-of-service attack before it actually starts an attack.

To attain the above object, in a first aspect of the invention, there is provided a malicious access-detecting apparatus for detecting malicious access made via networks on which monitoring devices are provided for monitoring the networks to detect network events. This malicious access-detecting apparatus is characterized by comprising an event information-storing section storing event information defining the network events including at least one predetermined type of network events that occur before a predetermined stage of a predetermined type of malicious access, a monitoring information-collecting section for collecting monitoring information including the detected network events, from the monitoring devices, a malicious apparatus group-deriving section for retrieving an associated piece of the event information from the event information-storing section, by using each detected network event in the collected monitoring information, as a key, the associated piece being associated with the key, and deriving, based on the retrieved pieces of the event information, apparatuses that are involved in relevant detected network events which belong to the predetermined type of network events and of which addresses of senders or recipients are same, as a malicious apparatus group involved in the predetermined type of malicious access, a malicious apparatus group-storing section for storing information on each derived malicious apparatus group, and an output section for outputting a list of the each derived malicious apparatus group.

To attain the above object, in a second aspect of the invention, there is provided a method of detecting malicious access made via networks on which monitoring devices are provided for monitoring the networks to detect network events. The malicious access-detecting method is characterized by comprising the steps of storing event information defining the network events including at least one predetermined type of network events that occur before a predetermined stage of a predetermined type of malicious access, collecting monitoring information including the detected network events, from the monitoring devices, retrieving an associated piece of the event information, by using each detected network event in the collected monitoring information, as a key, the associated piece being associated with the key, and deriving, based on the retrieved pieces of the event information, apparatuses that are involved in relevant detected network events which belong to the predetermined type of network events and of which addresses of senders or recipients are same, as a malicious apparatus group involved in the predetermined type of malicious access, storing information on each derived malicious apparatus group, and outputting a list of the each derived malicious apparatus group.

To attain the above object, in a third aspect of the invention, there is provided a malicious access-detecting program for causing a computer to carry out a process for detecting malicious access made via networks on which monitoring devices are provided for monitoring the networks to detect network events. The malicious access-detecting program is characterized in that the computer is caused to function as an event information-storing section storing event information defining the network events including at least one predetermined type of network events that occur before a predetermined stage of a predetermined type of malicious access, a monitoring information-collecting section for collecting monitoring information including the detected network events, from the monitoring devices, a malicious apparatus group-deriving section for retrieving an associated piece of the event information from the event information-storing section, by using each detected network event in the collected monitoring information, as a key, the associated piece being associated with the key, and deriving, based on the retrieved pieces of the event information, apparatuses that are involved in relevant detected network events which belong to the predetermined type of network events and of which addresses of senders or recipients are same, as a malicious apparatus group involved in the predetermined type of malicious access, a malicious apparatus group-storing section for storing information on each derived malicious apparatus group, and an output section for outputting a list of the each derived malicious apparatus group.

To attain the other object, in a fourth aspect of the present invention, there is provided a DDoS attack-detecting apparatus for detecting a distributed denial-of-service attack made via networks including monitoring devices for monitoring the networks to detect network events. This DDoS attack-detecting apparatus is characterized by comprising an event information-storing section storing event information defining the network events including at least one predetermined type of network events that occur before a predetermined stage of the distributed denial-of-service attack, a monitoring information-collecting section for collecting monitoring information including the detected network events, from the monitoring devices, a DDoS network-deriving section for retrieving an associated piece of the event information from the event information-storing section, by using each detected network event in the collected monitoring information, as a key, the associated piece being associated with the key, and deriving, based on the retrieved pieces of the event information, apparatuses that are involved in relevant detected network events caused to occur by using a same type of tool for the distributed denial-of-service attack and of which addresses of senders or recipients are same, as a malicious apparatus group which constitutes a DDoS network for executing the distributed denial-of-service attack, a DDoS network-storing section for storing information on each derived malicious apparatus group corresponding to each DDoS network, and an output section for outputting a list of the each derived malicious apparatus group.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 is a diagram showing an example of the data structure of data stored in an event information DB;

FIG. 10 is a diagram showing an example of a monitoring log;

FIG. 11 is a diagram showing an example of the data structure of data stored in a DDoS network DB;

FIG. 16 is a diagram showing an example of the data structure of data stored in an attacking power information DB;

DESCRIPTION OF THE PREFERRED EMBODIMENTS

The invention will now be described in detail with reference to the drawings showing preferred embodiments thereof. First, the concept of the invention applied to the embodiments will be described, and then a description will be given of details of the embodiments.

Figure 1:
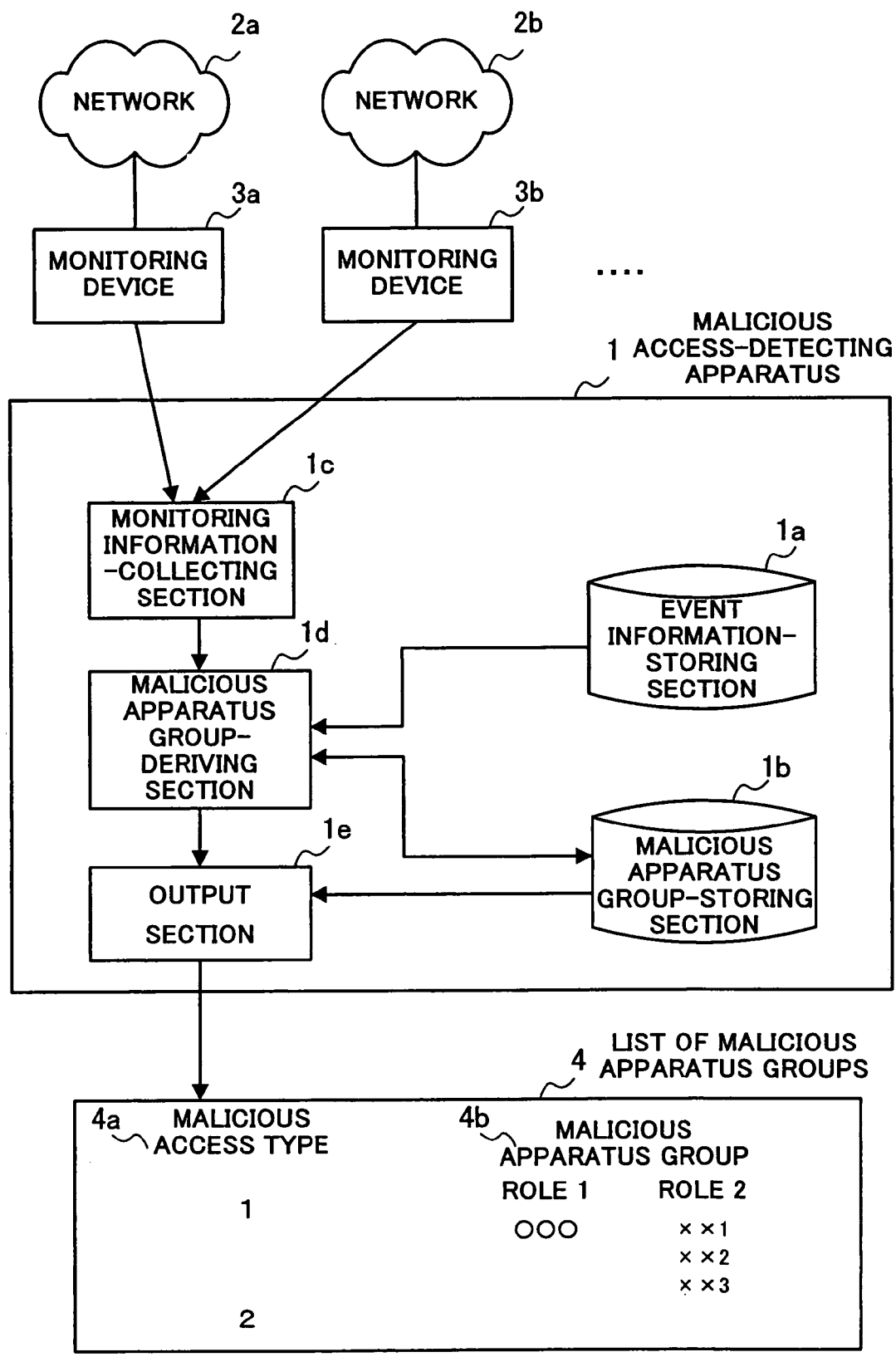
FIG. 1 is a schematic diagram of the concept of the present invention applied to preferred embodiments thereof.

FIG. 1 is a schematic diagram of the concept of the present invention applied to the embodiments. A malicious access-detecting apparatus 1 is comprised of an event information-storing section 1a storing event information, an malicious apparatus group-storing section 1b for storing information on malicious apparatus groups, a monitoring information-collecting section 1c for collecting monitoring information, an malicious apparatus group-deriving section 1d for deriving a malicious apparatus group from the monitoring information, and an output section 1e for outputting a list of the detected malicious apparatus groups (malicious apparatuses of each group).

The event information-storing section 1a stores event information defining network events (hereinafter referred to as "events"). Normally, malicious access causes predetermined events to occur in a preparatory stage, i.e. before it reaches its predetermined stage (e.g. start of an attack). Each event occurs as a communication message transmitted between apparatuses (hereinafter referred to as "malicious apparatuses") compromised by a malicious user over a network, or between malicious apparatuses compromised by the malicious user and an attacking apparatus used by the malicious user for sending instructions for malicious access. Events caused to occur vary from one type of malicious access to another, so that definitions of the events are provided according to the type of malicious access. Further, the roles of a sender apparatus and a recipient apparatus vary with the event, and therefore roles associated with each events are also defined in the event information.

The malicious apparatus group-storing section 1b stores the addresses of malicious apparatus groups involved in malicious access currently underway.

The monitoring information-collecting section 1c collects monitoring information from monitoring devices 3a, 3b, . . . that monitor respective networks 2a, 2b, . . . to detect events. At least the names of events detected by the monitoring devices 3a, 3b, . . . , and the addresses of the senders and recipients of the events are set in the monitoring information.

The malicious apparatus group-deriving section 1d determines a malicious apparatus group to which belong malicious apparatuses involved in events, by using the monitoring information collected by the monitoring information-collecting section 1c and the event information, and sets malicious apparatus information on the malicious apparatuses in a corresponding malicious apparatus group-registering area of the malicious apparatus group-storing section 1b. More specifically, first, a corresponding piece of event information is retrieved from the event information-storing section 1a by using each event set in the monitoring information as a key. Then, the type of malicious access associated with the event is identified based on the retrieved event information. Then, apparatuses which are thus determined to be involved in events which are associated with the same type of malicious access, and of which addresses of senders or recipients are the same are regarded as one group. In other words, the malicious apparatus group-storing section 1b is searched to compare the addresses registered in malicious apparatus groups associated with the identified type of malicious access with the address of a sender or a recipient of each event set in the current monitoring information. If there exists a malicious apparatus group storing the same address as those of events, the group of malicious apparatuses derived this time are added to the existing or registered malicious apparatus group. If there is no such a malicious apparatus group, the group of malicious apparatuses derived this time is stored in the malicious apparatus group-storing section 1b as a new malicious apparatus group. In doing this, the roles of the malicious apparatuses involved in the events are determined with reference to the event information, and the malicious apparatuses are classified according to the detected roles.

The output section 1e outputs a list 4 of the malicious apparatus groups (malicious apparatuses thereof) derived by the malicious apparatus group-deriving section 1d.

It should be noted that the section described above are implemented by a computer which is caused to perform a malicious access-detecting program.

According to the malicious access-detecting apparatus 1, the monitoring information-collecting section 1c collects monitoring information generated by the monitoring devices 3a, 3b, . . . on the networks 2a, 2b, . . . . Then, the malicious apparatus group-deriving section 1d retrieves event information from the event information-storing section 1a, using each event set in the monitoring information as a key. After that, apparatuses that are involved in events which are associated with the same type of malicious access identified based on the retrieved event information, and of which sender addresses or recipient addresses are the same are combined into one group to thereby derive them as a malicious apparatus group involved in a specific malicious access, and store the group in the malicious apparatus group-storing section 1b. More specifically, the type of malicious access corresponding to a type of each event is determined on an event-by-event basis, and it is determined based on the determined type of malicious access whether or not a malicious apparatus group in which is registered a malicious apparatus having the same sender address or recipient address as that of the event is stored in the malicious apparatus group-storing section 1b. If the malicious apparatus group has already been stored, the malicious apparatus (the sender address or recipient address of the event) derived this time is added to the malicious apparatus group already stored. If the malicious apparatus group has not been stored, the sender address and the recipient addresses are stored as a new malicious apparatus group in the malicious apparatus group-storing section 1b. By repeating this process whenever monitoring information is obtained, the addresses of the malicious apparatuses of the detected groups are accumulated. The output section 1e delivers a list 4 showing the addresses of the malicious apparatus groups derived by the malicious apparatus group-deriving section 1d.

The list 4 of the malicious apparatus groups shows the addresses of each malicious apparatus group 4b detected as the sender and recipient of each event involved in the associated type of malicious access, in a state classified according to a malicious access type 4a. The addresses are listed in groups classifying the addresses according to the detected roles of malicious apparatuses.

As described above, according to the present invention, monitoring information which records events occurring before a malicious access reaches its predetermined stage is collected, and a malicious apparatus group is detected based on the monitoring information, so that it is possible to derive the malicious apparatus group in advance. This makes it possible to predict the scale of an attack to be executed through the malicious access and that of damage caused by the attack, before the attack through the malicious access is executed, and thereby makes it possible to take an effective countermeasure against the attack.

Hereinafter, a detailed description will be given of the embodiment (general aspect thereof) of the invention.

Figure 2:
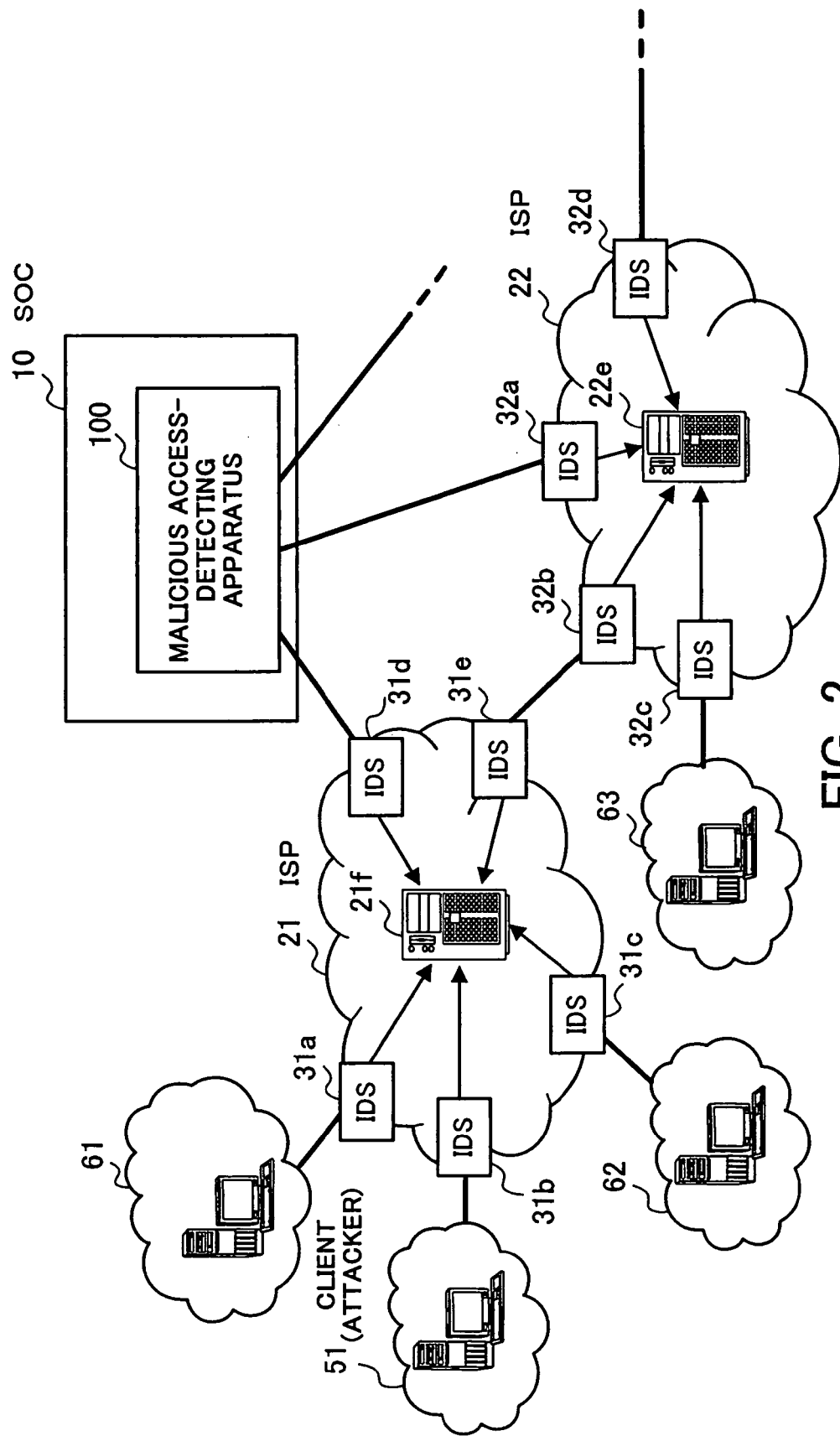
FIG. 2 is a diagram showing an example of the configuration of a network system according to an embodiment of the invention.

FIG. 2 is a diagram showing an example of the configuration of a network system according to the embodiment of the invention.

The network system to which is applied the embodiment of the invention is formed by an aggregate of local ISP (Internet Service Provider) networks 21, 22 . . . , such as ISP networks constructed by Internet providers.

Communication packets flowing through the ISP network 21 are monitored by IDSes (Instruction Detection Systems; Instruction Detection Tools) 31a, 31b, 31c, 31d, and 31e which generate monitoring logs. The IDS is widely used for security measures in finding out packets matching a malicious access pattern by monitoring packets flowing through the network. That is, the IDS discovers some type of event and outputs information on the event to a monitoring log. The IDS is made capable of detecting malicious access patterns by being provided with a database (DB) defining the patterns, in advance. In general, a monitoring log records times at which monitoring has performed, detected events (malicious access patterns), the IP addresses of senders and recipients of the events, and so forth. The monitoring logs generated by the IDSes 31a, 31b, 31c, 31d, and 31e are compiled by a server 21f, and delivered to a malicious access-detecting apparatus 100 of an SOC (Security Operation Center) 10 for security management. Similarly, communication packets flowing through the ISP network 22 are monitored by the IDSes 32a, 32b, 32c, and 32d which generate monitoring logs. The generated monitoring logs are complied by a server 22e, and delivered to the malicious access-detecting apparatus 100.

Now, let it be assumed that an attacking person connects a client 51 to the network 21, and gives instructions to stepping stones 61, 62, and 63 which are compromised by the client 51. In this case, for example, monitoring information on communication packets flowing into the network 21 via the client 51 is generated by the IDS 31b. Further, monitoring information on communication packets flowing into the network 21 via the stepping stones 61, 62, and 63 is generated by the IDSes 31a, 31c, and 32c.

Figure 3:
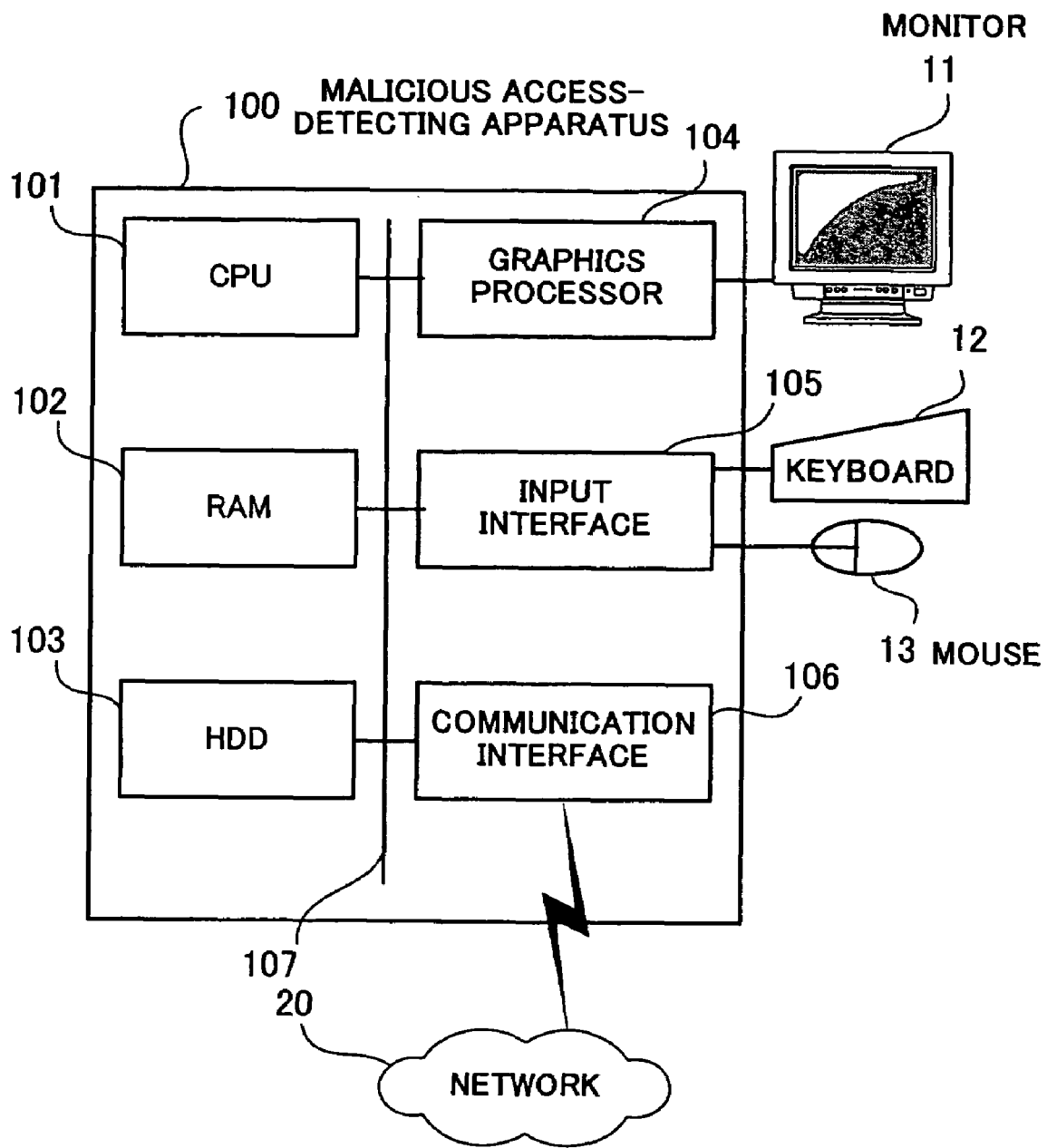
FIG. 3 is a diagram showing an example of the hardware configuration of a malicious access-detecting apparatus according to the embodiment.

FIG. 3 is a diagram showing an example of the hardware configuration of the malicious access-detecting apparatus according to the present embodiment.

The overall operation of the malicious access-detecting apparatus 100 is controlled by a CPU (Central Processing Unit) 101. A RAM (Random Access Memory) 102, a hard disk drive (HDD) 103, a graphics processor 104, an input interface 105, and a communication interface 106 are connected to the CPU 101 via a bus 107.

The RAM 102 temporarily stores at least part of the program of an OS (Operating System) and application programs executed by the CPU 101. Further, the RAM 102 stores various data necessitated in processing by the CPU 101. The HDD 103 stores the OS and the application programs. The graphics processor 104 is connected to a monitor 11 to display an image on the screen of the monitor 11 in response to commands from the CPU 101. The input interface 105 has a keyboard 12 and a mouse 13 connected thereto, for sending signals received from the keyboard 12 and the mouse 13 to the CPU 101 via the bus 107. The communication interface 106 is connected to a network 20, and performs transmission and reception of data to and from other computers over the network 20.

The hardware configuration described above can implement the processing functions of the present embodiment. Although FIG. 3 shows the example of the hardware configuration of the malicious access-detecting apparatus, the IDSes can be also implemented by the same hardware configuration.

The following description is given of an example of application of the present embodiment to the detection of and protection from a DDoS attack. In the detection of malicious access by the malicious access-detecting apparatus of the present embodiment, a group of malicious apparatuses involved in malicious access can be derived, which is especially effective for protection from an attack, such as the DDoS attack, in which a malicious apparatus group simultaneously carry out malicious processes.

Figure 4:
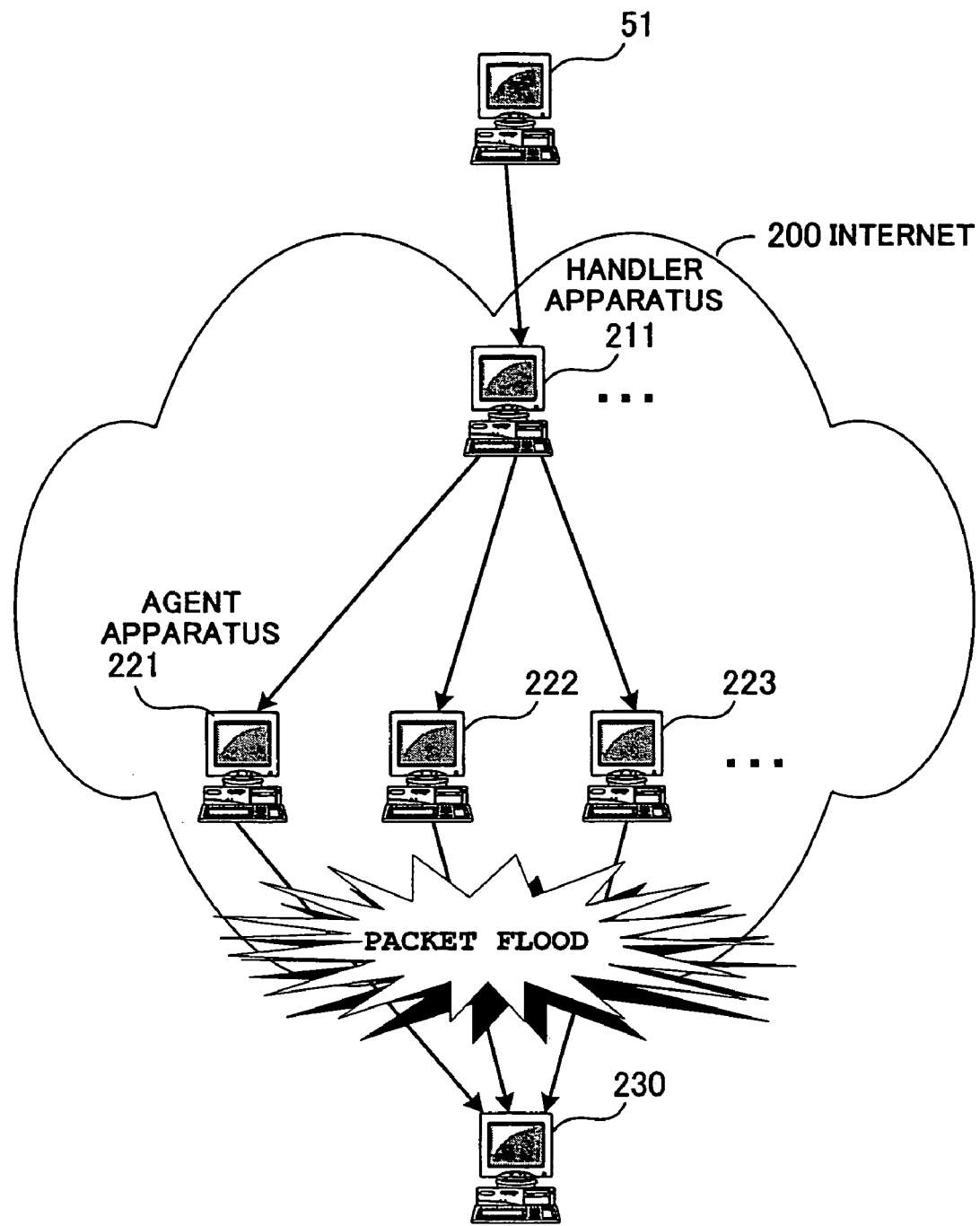
FIG. 4 is a diagram showing the mechanism of occurrence of a DDoS attack.

FIG. 4 is a diagram showing a mechanism of occurrence of the DDoS attack. In the illustrated example, a case is assumed in which an attacking person uses the client 51 to attack a web server 230. Hereinafter, a client used by the attacking person is referred to as the "attacker".

The attacking person using the attacker 51 causes computers accessible via the Internet 200 to function as agent apparatuses 221, 222, 223, . . . . The attacker 51 transmits instructions thereof to the agent apparatuses 221, 222, 223, . . . via a handler apparatus 211.

Now, the above described term "agent" is intended to mean a kind of program for causing a computer to perform a processing function of transmitting a large amount of packets to a target (arbitrary apparatus or network) of the DDoS attack. Computers having the "agent" received therein become hosts that directly cause damage to the target.

The "handler", which is analogous to an interface between the attacker 51 used by the attacking person and the agent apparatuses 221, 222, 223, . . . , is a kind of program for causing a computer to execute functions required for the attacker 51 to operate the agents. Computers having the "handler" received therein become hosts for externally instructing the agent apparatuses.

In general, the agent and the handler are installed into machines (apparatuses) which are vulnerable and hence compromised by the attacking person over the network. The installation of the agent or the handler changes the machines into agent apparatuses or handler apparatuses. Usually, a plurality of agent and handler apparatuses are set on the network.

The attacking person operates the attacker 51 to provide the handler apparatus 211 with a command. When provided with the command, the handler apparatus 211 converts the command into an operation/configuration command for the agent apparatuses 221, 222, 223, . . . , and transmits the operation/configuration command to the agent apparatuses. The agent apparatuses 221, 222, 223, . . . perform a processing function using a kind of server software. When the agent apparatuses receive the command from the handler apparatus 211, they execute attacks corresponding to the contents of the command. For example, they send a large amount of packets (packet flood) to the web server 230 as the victim.

The installation and configuration of software for introducing the handler and the agent into computers on a network is executed over the network. Therefore, communications involved therein can be detected on the network (so long as they are not encrypted). Further, the DDoS attack is often executed using dedicated tools (DDoS attack-generating tools), which are varied in type. Each of the tools generates an event by following the procedure of operations according to a predetermined DDoS attack scenario.

Therefore, in the embodiments of the present invention, monitoring information generated by monitoring devices (IDSes) disposed on a network is collected, and the whole aspect of a malicious apparatus group (DDoS network) involved in the preparation of DDoS attack is analyzed using events stored in the monitoring information. In the following description, apparatuses having the handler and the agent installed therein are also referred to as the "handler(s)" and the "agent(s)".

First Embodiment

Figure 5:
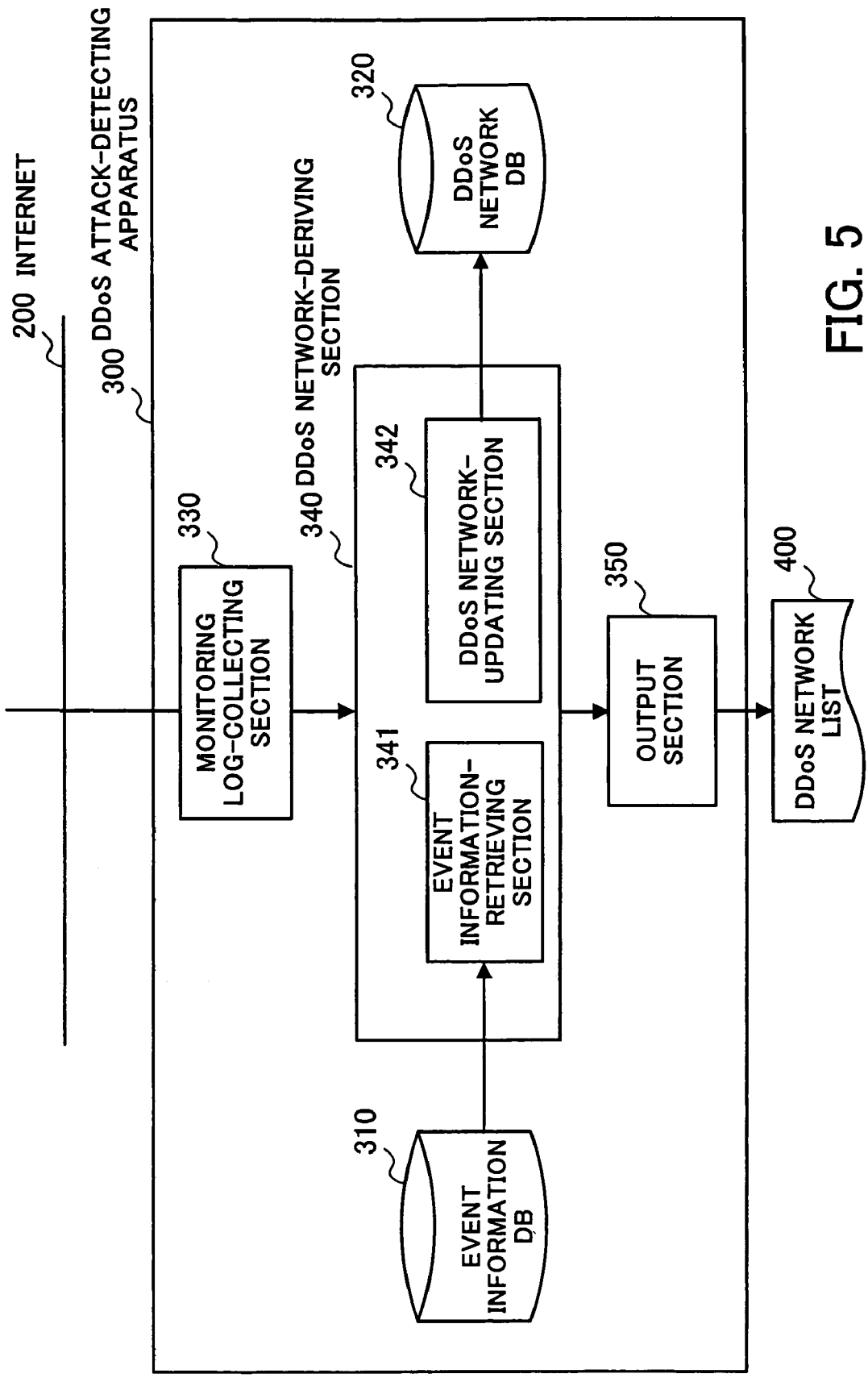
FIG. 5 is a block diagram showing the internal configuration of a DDoS attack-detecting apparatus according to a first embodiment of the present invention.

First, a description will be given of a first embodiment of the present invention. FIG. 5 is a block diagram showing the internal configuration of a DDoS attack-detecting apparatus according to the first embodiment. Each functional block is realized by causing the computer to perform a DDoS attack-detecting program.

The DDoS attack-detecting apparatus 300 according to the present embodiment is connected to the Internet 200, and is comprised of an event information database (DB) 310, a DDoS network database (DB) 320, a monitoring log-collecting section 330, a DDoS network-deriving section 340, and an output section 350. The DDoS network-deriving section 340 is comprised of an event information-retrieving section 341, and a DDoS network-updating section 342.

The event information DB 310 is an event information-storing section storing event information which defines events that occur before a DDoS attack reaches a predetermined stage (attack itself), e.g. in a preparatory stage thereof in which a DDoS network is formed by an attacker for the DDoS attack. In the event information, the types of events to occur, the roles (attacker, handler, agent, etc.) of the senders and recipients of the events, etc. are defined according to the type of DDoS attack-generating tool. A DDoS attack is executed by DDoS attack-generating tools (hereinafter referred to as "tools"), and events caused to occur (particularly in the preparatory stage) vary with the tool. Therefore, the above-mentioned types of the DDoS attack-generating tool are assumed to be the types of the events.

The DDoS network DB 320 is a DDoS network-storing section for storing information on (i.e. registering) apparatuses belonging to a group (malicious apparatus group) comprised of an attacker, handlers, and agents forming a DDoS network for a DDoS attack (preparatory stage) currently underway.

The monitoring log-collecting section 330 acquires monitoring logs from monitoring devices that monitor the respective networks via the Internet 200. A monitoring log stores at least detected events, and the addresses of senders and recipients of each event. The acquired monitoring logs are transmitted to the DDoS network-deriving section 340.

The event information-retrieving section 341 of the DDoS network-deriving section 340 retrieves corresponding event information from the event information DB 310 using each event stored in the obtained monitoring log as a key. The DDoS network-updating section 342 identifies the type of a tool associated with the event stored in the monitoring log based on the retrieved event information, and determines whether or not a DDoS network corresponding to the identified type of the tool exists in the DDoS network DB 320, and further whether there is any registered apparatus belonging to the DDoS network and having the same address as that of the sender or recipient of the event. If the compared tool types are the same, and the address of the registered apparatus is the same as that of the sender or recipient of the event, the sender and recipient of the event are regarded to belong to the DDoS network, and apparatuses identified by the addresses of the sender and recipient of the event are added to the DDoS network. If the compared tool types are not identical or there is no registered apparatus having the same address as that of the sender or recipient of the event, the addresses of the sender and the recipient of the event are registered as a new DDoS network. In doing this, the sender and the recipient are classified according to the roles thereof defined in the event information.

By repeatedly performing the above processing on each monitoring log record, the whole aspect of each DDoS network for the DDoS attack (preparatory stage) currently underway is registered.

The output section 350 outputs a DDoS network list 400 describing groups of malicious apparatuses constituting the DDoS networks derived by the DDoS network-deriving section 340.

Hereinafter, a description will be given of operations of the DDoS attack-detecting apparatus 300 configured as above. As described above with reference to FIG. 4, the DDoS attack is performed after stages following the DDoS attack scenario. More specifically, an attack command is issued after completion of a stage (deployment stage) in which a handler and an agent are sent into hosts, a stage (installation stage) in which the programs are started, and a stage (customization stage) in which various configurations are executed.

Figure 6:
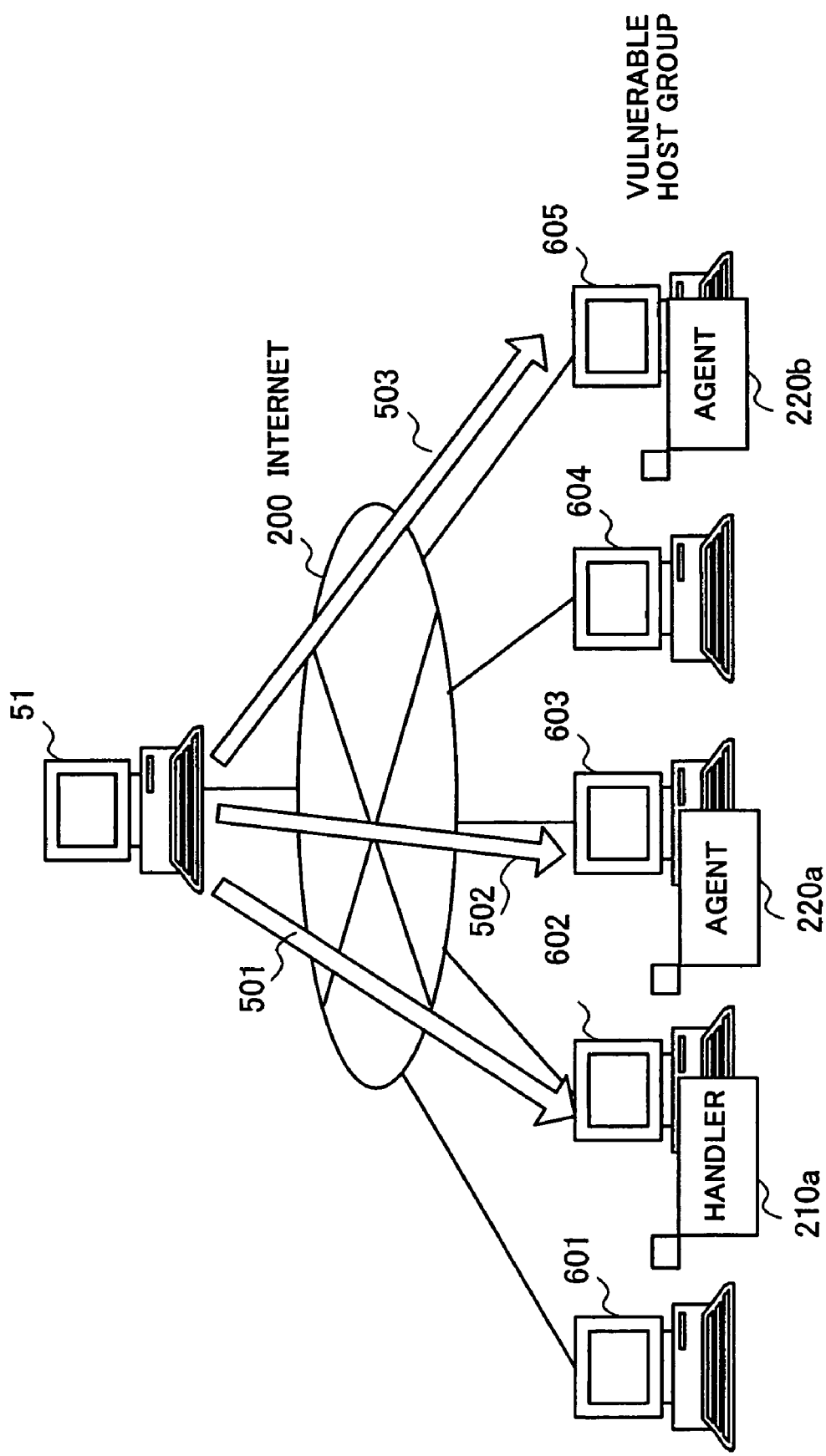
FIG. 6 is a diagram showing events occurring in a deployment stage.

Now, a description will be given of the deployment stage as the first stage. FIG. 6 is a diagram showing events occurring in the deployment stage. In the deployment stage, a handler 210a, and agents 220a and 220b, which are kinds of program and existing as files, are sent into vulnerable hosts 601, 602, 603, 604, and 605, from the attacker 51 over the Internet 200. This section that the attacker 51 is the sender of events occurring in the deployment stage, and a group of hosts into which the handler and the agent are sent are the respective recipients of the events. In the illustrated example, the handler 210a is sent from the attacker 51 (sender) to the host 602 (recipient) by an event 501. Similarly, the agent 220a is sent from the attacker 51 to the host 603 by an event 502, and the agent 220b is sent from the attacker 51 to the host 605 by an event 503. In the following, a host having a handler received therein is called a handler, and a host having an agent received therein is called an agent.

Figure 7:
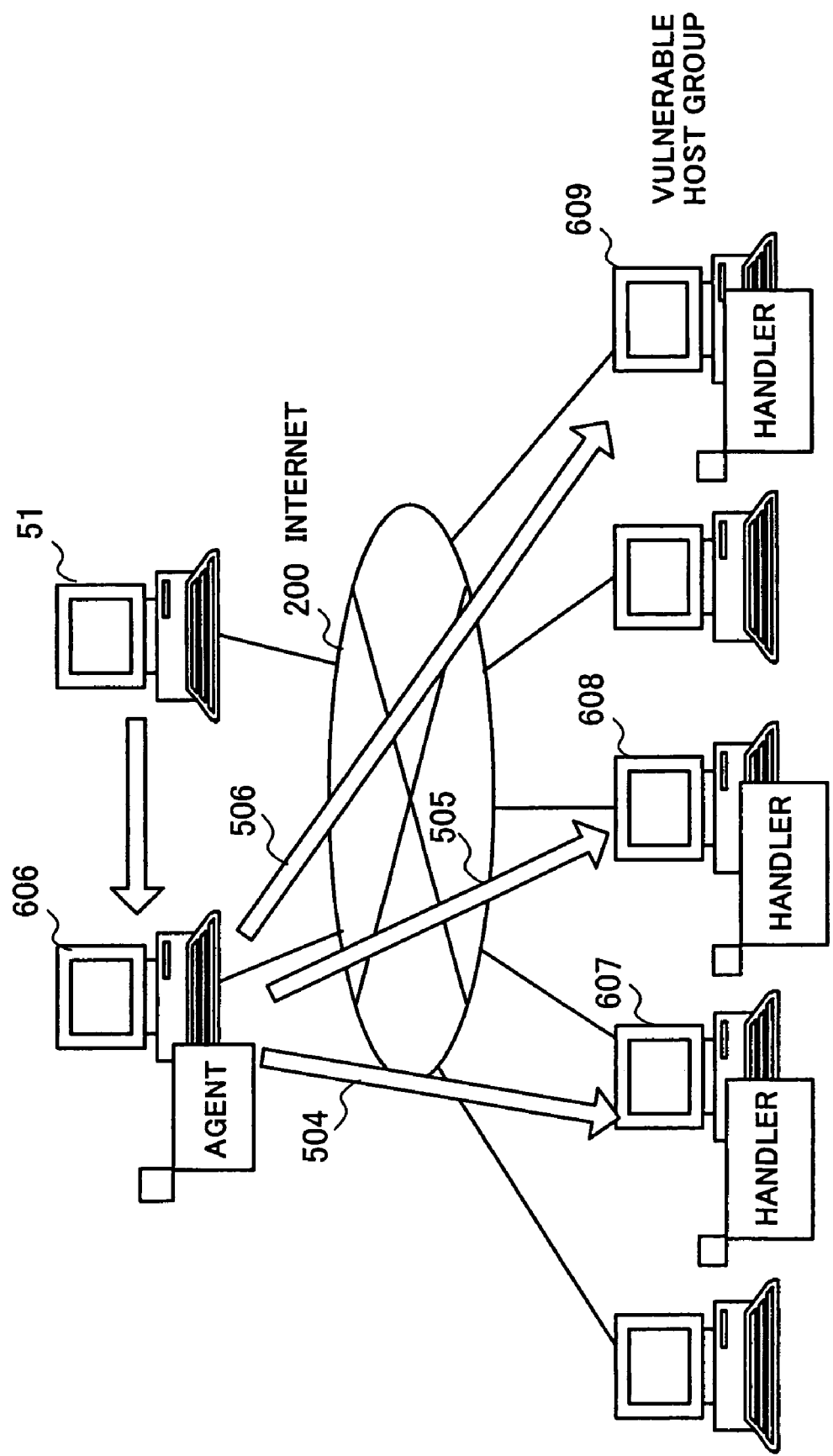
FIG. 7 is a diagram showing events occurring in an installation stage.

Next, a description will be given of the installation stage as the second stage. FIG. 7 is a diagram showing events occurring in the installation stage. In the installation stage, the attacker delivers an installation command for starting the program to an agent 606 from the attacker 51 over the Internet 200. The agent 606 having received the installation command starts the program, and then simultaneously sends messages to all the handlers. This section that the agent 606 functions as the sender of events 504, 505, and 506 occurring in the installation stage, and the handlers 607, 608, and 609 are the respective recipients of the events.

Figure 8:
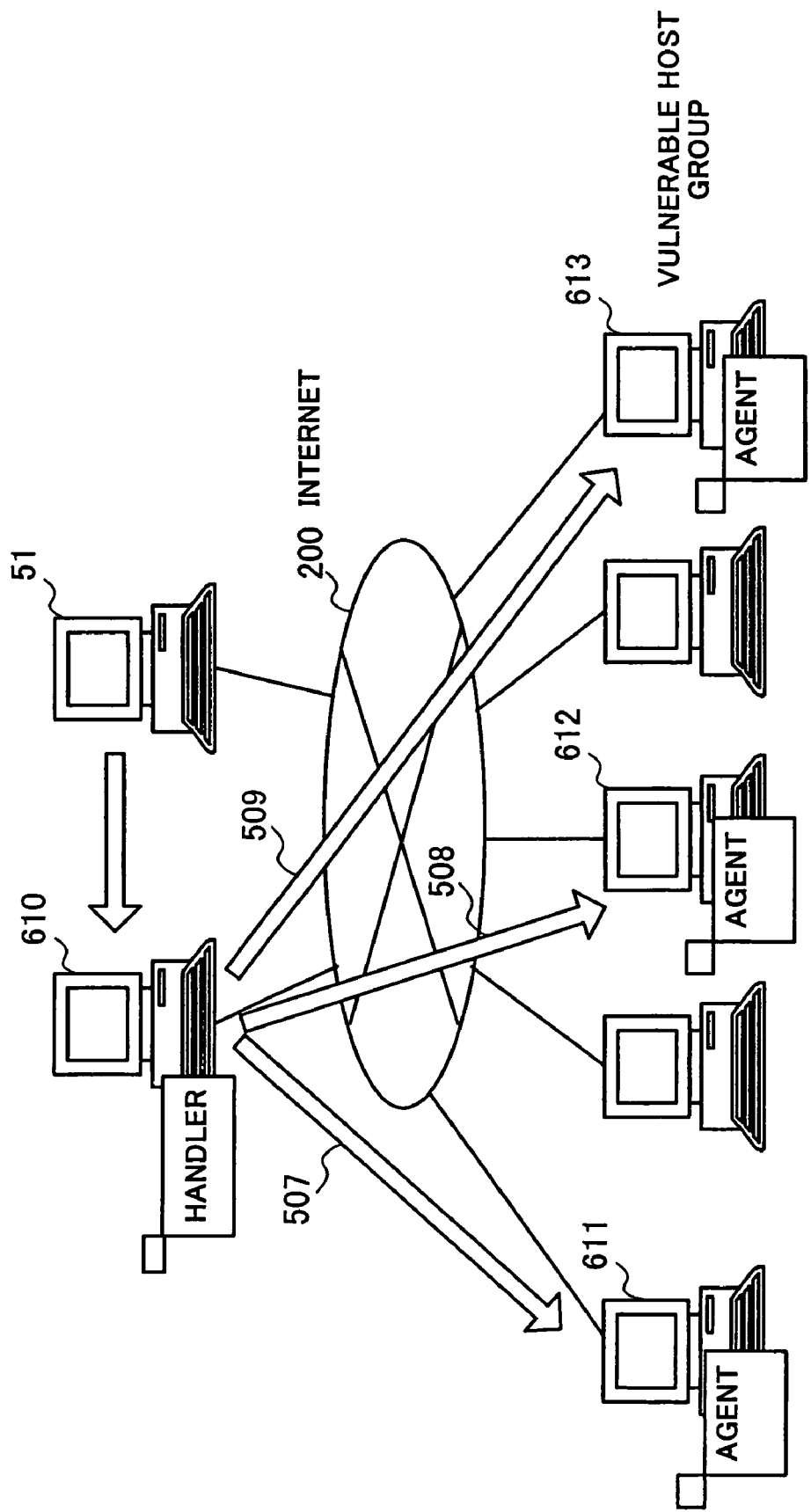
FIG. 8 is a diagram showing events occurring in a customization stage.

Then, a description will be given of the customization stage as the third stage. FIG. 8 is a diagram showing events occurring in the customization stage. In the customization stage, the attacking person instructs a handler 610 to operate and manage the agents, from the attacker 51 over the Internet 200. The handler 610 transmits instruction messages to the agents 611, 612, and 613. This section that the handler 610 is the sender of events 507, 508, and 509 occurring in the customization stage, and the agents 611, 612, and 613 are the respective recipients of the events.

As described hereinabove, it is possible to identify the roles (attacker, handler, and agent) of the sender and recipient from events occurring in dependence on the different stages of a DDoS attack, and detect machines belonging to the same DDoS network.

For example, assuming that events in the deployment stage contain the same address of the sender as the attacker, the recipients of the events are the handlers and the agents into which the programs have been sent by the same attacker, which makes it possible to regard the handlers and the agents as members of the same DDoS network. Further, assuming that events in the installation stage contain the same sender as an agent, the recipients of the events are the handlers to which a control communication was simultaneously transmitted by the same agent. This section that the handlers belong to the same DDoS network. Similarly, assuming that events in the customization stage contain the same sender as a handler, the recipients of the events are the agents to which a control communication was simultaneously transmitted by the same handler. This section that the agents belong to the same DDoS network.

The event information is set by defining the relationship between events and the senders and recipients of the events.

FIG. 9 is a diagram showing an example of the data structure of data stored in the event information DB. In the event information DB 310, the types of events caused to occur by tools, the roles of senders and recipients of the events, and keys for associating the senders and recipients of events with a DDoS network are registered, on a tool type-by-tool type basis, in a state associated with each other. For example, a definition 311 concerning a type of event "trinoo agent deploy" occurring when the tool type is "Trinoo" defines that the sender of the event functions as "an attacker", and the recipient thereof as "an agent", and further that "attacker" is to be used as an associating key.

When the event information described above is stored in the event information DB 310, the processing is started. The monitoring log-collecting section 330 collects the monitoring logs over the Internet 200. FIG. 10 is a diagram showing an example of a monitoring log. In the monitoring log 240, there are recorded dates and times at which the monitor apparatus detected events, detected event names, and the sender address and recipient address of each event. For example, in a log record 241, there are stored a detection date and time of "Apr. 23, 2004 16:32:09", an detected event name of "trinoo agent deploy", a sender addresses of "xxx.10.20.30", and a recipient address of "xxx.30.40.50".

The event information-retrieving section 341 of the DDoS network-deriving section 340 searches the event information DB 310 using the detected event name "trinoo agent deploy" of the log record 241 as a key. As a result of the search, there is acquired the definition 311 of the event type "trinoo agent deploy", that is, tool type: "Trinoo"; role of sender: "attacker"; role of recipient: "agent"; and associating key: "attacker". Therefore, the DDoS network-updating section 342 finds, based on definition 311 of the retrieved event type "trinoo agent deploy", and the tool type. "Trinoo", that the log record 241 indicates a message sent from "attacker" (sender) to "agent" (recipient). Then, the event information-retrieving section 341 searches the DDoS network DB 320 using the tool type "Trinoo" and the associating key "attacker". When no hit occurs, the sender address "xxx.10.20.30" of "attacker", and the recipient address "xxx.30.40.50" of "agent" are entered in the DDoS network DB 320 in association with the tool type "Trinoo".

FIG. 11 is a diagram showing an example of the data structure of data stored in the DDoS network DB. For each entry of a detected DDoS network, a tool type, and the addresses of an attacker, handlers, and agents are registered in the DDoS network DB 320 in a state associated with each other.

In the case of the log record 241, when no DDoS network corresponding to the detected event is found in the DDoS network DB 320, the tool type "Trinoo", the sender address "xxx.10.20.30" of "attacker", and the recipient address "xxx.30.40.50" of "agent" are set in the DDoS network DB 320 as entries of a DDoS network.

Similarly, as to a log record 242 "detection date and time=Apr. 23, 2004 19:05:47, detected event name=Trinoo agent deploy, sender address=xxx.10.20.30, recipient address=xxx.80.70.60", the definition 311 of the event type "trinoo agent deploy" is retrieved. Then, the DDoS network DB 320 is searched using the tool type "Trinoo" and the associating key "attacker", to detect the entry of "attacker=xxx. 10.20.30" entered in the above entry operation. Therefore, the recipient address "xxx.80.70.60" is entered in the box "agent" of the same DDoS network entry.

When the associating key is "handler" or "agent", the DDoS network DB 320 is similarly searched, for the address of the same handler or agent as that recorded in the monitoring log, using the associating key. When the address of the same handler or agent is detected, the address of the sender or recipient is entered in a predetermined associated role of the DDoS network.

The above procedure of operations is repeatedly performed, whereby the addresses of the attacker, the handlers, and the agents, all of which belong to the same DDoS network, are detected and accumulated in the DDoS network DB 320. As is clear from FIG. 11, a plurality of addresses are entered in the boxes of the handler and the agent for each entry of a DDoS network to form a list.

Next, a description will be given of a process for detecting a DDoS network with reference to a flowchart. In the following, there will be described a case where a DDoS network is detected using an attacker (name thereof) as a key, a case where a DDoS network is detected using a handler (name thereof) as a key, and a case where a DDoS network is detected using an agent (name thereof) as a key, in the mentioned order.

Figure 12:
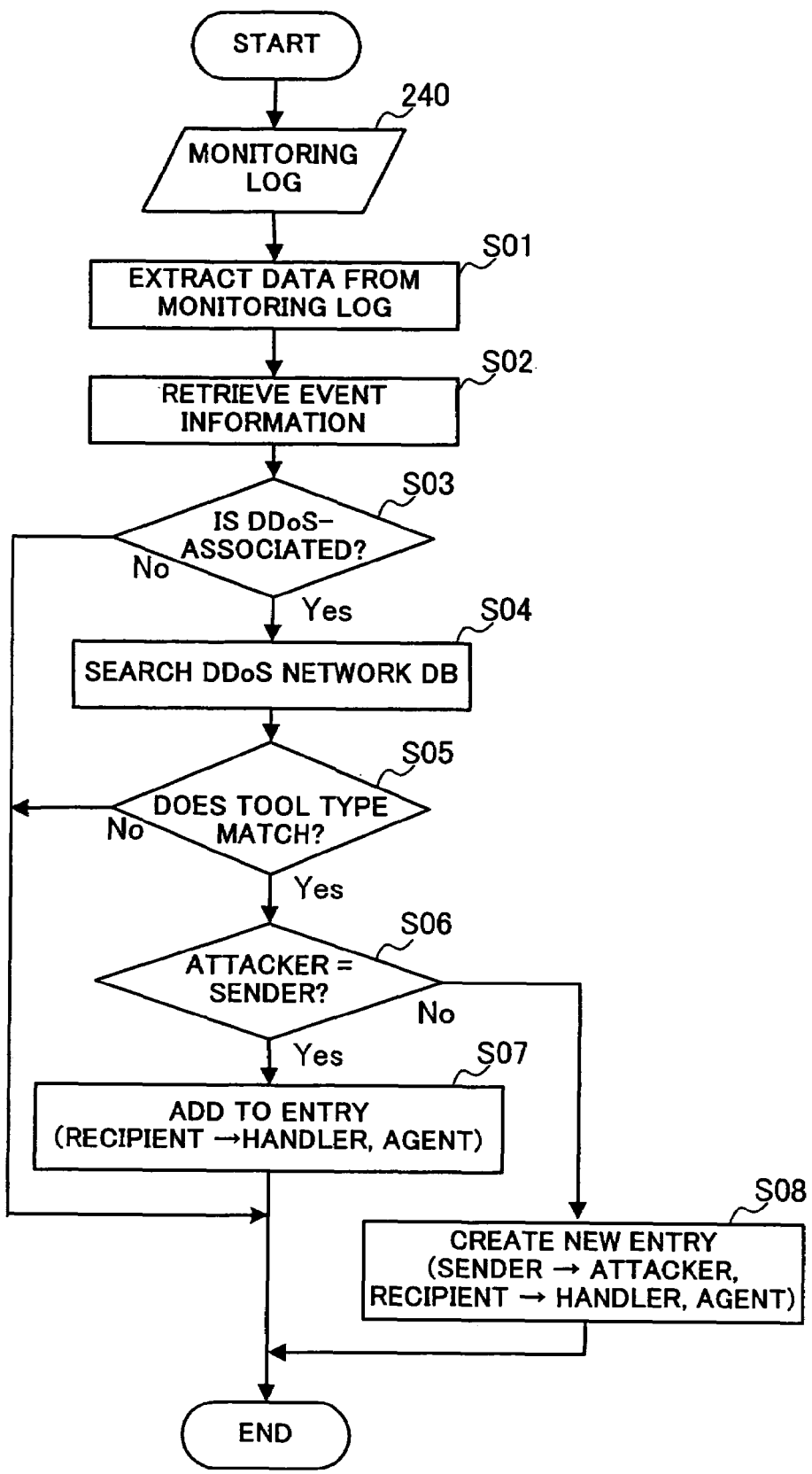
FIG. 12 is a flowchart showing a DDoS network-detecting process using information on an attacker as a key.

First, a description will be given of the case where a DDoS network is detected using an attacker as a key. FIG. 12 is a flowchart showing a DDoS network-detecting process using an attacker as a key.

[Step S01] Data of "detected event name", "sender", and "recipient" are extracted from a record of the monitoring log 240.

[Step S02] The event information DB 310 is searched using "detected event name" extracted in the step S01 as a key, and corresponding event information is extracted. As a result, "tool type", "role of recipient", and "associating key" are acquired.

[Step S03] It is determined whether or not "event information" is associated with the DDoS attack. More specifically, it is determined whether or not corresponding event information has been detected by the search in the step S02. If the event information exists in the event information DB 310, it is DDoS attack-associated information, whereas if the event information does not exist in the event information DB 310, the detected event is not associated with the DDoS attack, and hence the process is immediately terminated.

[Step S04] Since "event information" is associated with the DDoS attack, the DDoS network DB 320 storing DDoS networks (preparation therefor) currently underway is searched using "tool information" of extracted "event information" as a key.

[Step S05] It is determined whether or not a DDoS network having an entry of the same "tool type" exists in the DDoS network DB 320. If such a DDoS network is not detected, the process proceeds to a step S08.

[Step S06] Since the entry of the same "tool type" has been detected in the DDoS network DB 320, the "attacker" entered along with the entry of the "tool type" is compared with the sender recorded in the record of the monitoring log, whereby it is determined whether or not they are the same (identical to each other). If they are not the same, the process proceeds to the step S08.

[Step S07] In the detected entry (identical in "tool type" and "attacker") of the DDoS network, "recipient" is added to "handler" or "agent". Whether the "recipient" should be entered in "handler" or "agent" is determined based on the "role of recipient" defined in the retrieved event information. After completion of the entry, the process is terminated.

[Step S08] When no entry of a DDoS network (identical in "tool type" and "attacker") has been detected, a new entry of the DDoS network is created to register the "sender" as the "attacker", and the "recipient" as the "handler" or "agent". Whether the "recipient" should be entered in the "handler" or "agent" is determined similarly to the step S07. After completion of the entry, the process is terminated.

By performing the above DDoS network-detecting process, a DDoS network is detected from the monitoring log recording events which mainly occur in the deployment stage and of which the sender is the attacker and each recipient is a handler or an agent.

Figure 13:
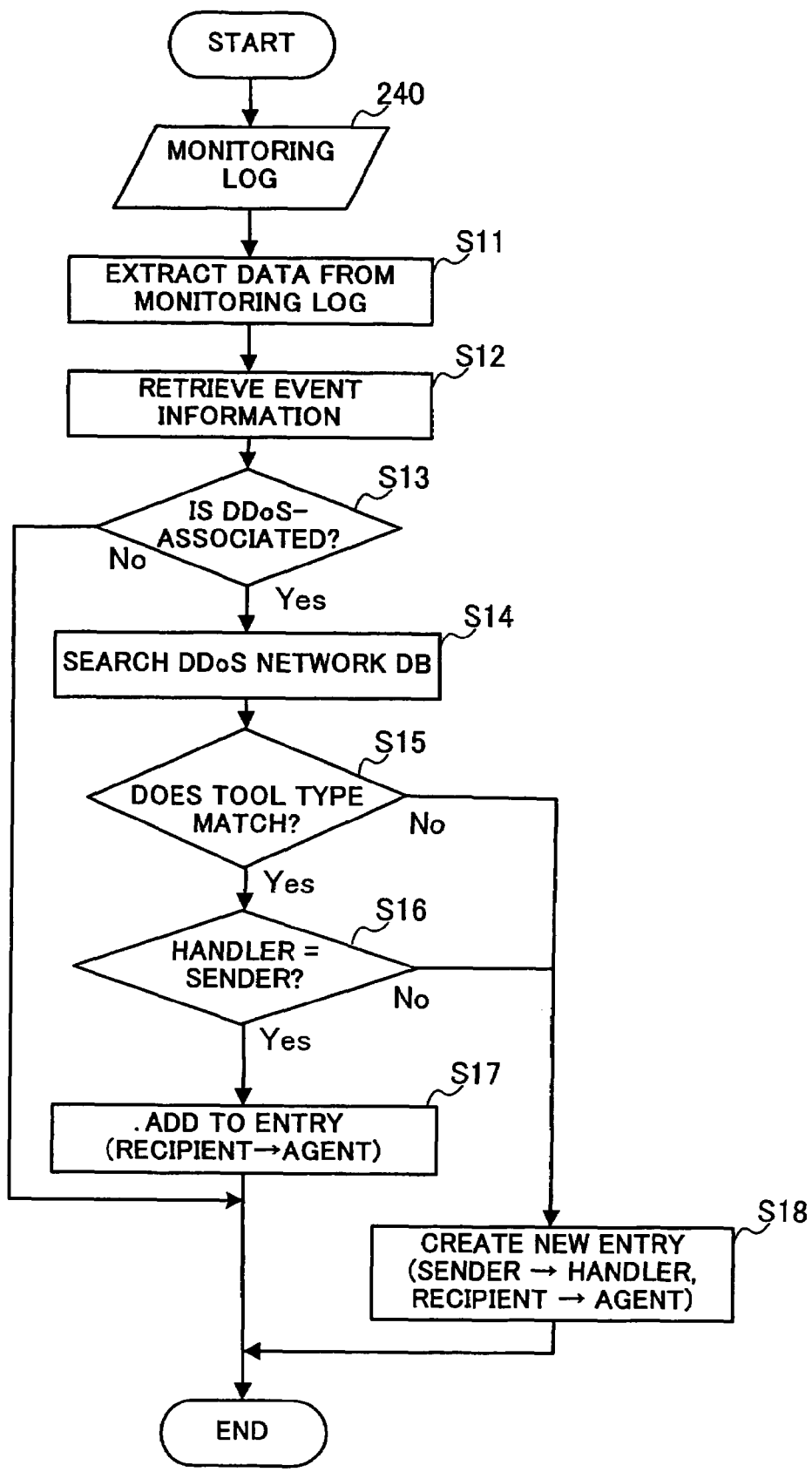
FIG. 13 is a flowchart showing a DDoS network-detecting process using information on a handler as a key.

Next, a description will be given of the case where a DDoS network is detected using a handler as a key. FIG. 13 is a flowchart showing a DDoS network-detecting process using a handler as a key.

[Step S11] Data of "detected event name", "sender", and "recipient" are extracted from a record of the monitoring log 240.

[Step S12] The event information DB 310 is searched using "detected event name" extracted in the step S11 as a key, and corresponding event information is extracted. As a result, "tool type", "role of recipient", and "associating key" are acquired.

[Step S13] It is determined whether or not "event information" is associated with the DDoS attack. More specifically, it is determined whether or not corresponding event information has been detected by the search in the step S12. If the event information exists in the event information DB 310, it is DDoS attack-associated information, whereas if the event information does not exist in the event information DB 310, the detected event is not associated with the DDoS attack, and hence the process is immediately terminated.

[Step S14] Since "event information" is associated with the DDoS attack, the DDoS network DB 320 storing DDoS networks (preparation therefor) currently underway is searched using "tool information" of extracted "event information" as a key.

[Step S15] It is determined whether or not a DDoS network having an entry of the same "tool type" exists in the DDoS network DB 320. If such a DDoS network is not detected, the process proceeds to a step S18.

[Step S16] Since the entry of the same "tool type" has been detected in the DDoS network DB 320, the "handler" entered along with the entry of the "tool type" is compared with the sender recorded in the record of the monitoring log, whereby it is determined whether or not they are the same. If they are not the same, the process proceeds to the step S18.

[Step S17] In the detected entry (identical in "tool type" and "handler") of the DDoS network, "recipient" is added to "agent". After completion of the entry, the process is terminated.

[Step S18] When no entry of a DDoS network (identical in "tool type" and "handler") has been detected, a new entry of the DDoS network is created to register the "sender" as the "handler", and the "recipient" as the "agent", followed by terminating the present process.

By performing the above DDoS network-detecting process, a DDoS network is detected from the monitoring log recording events which mainly occur in the deployment stage and of which the sender is a handler and each recipient is an agent.

Figure 14:
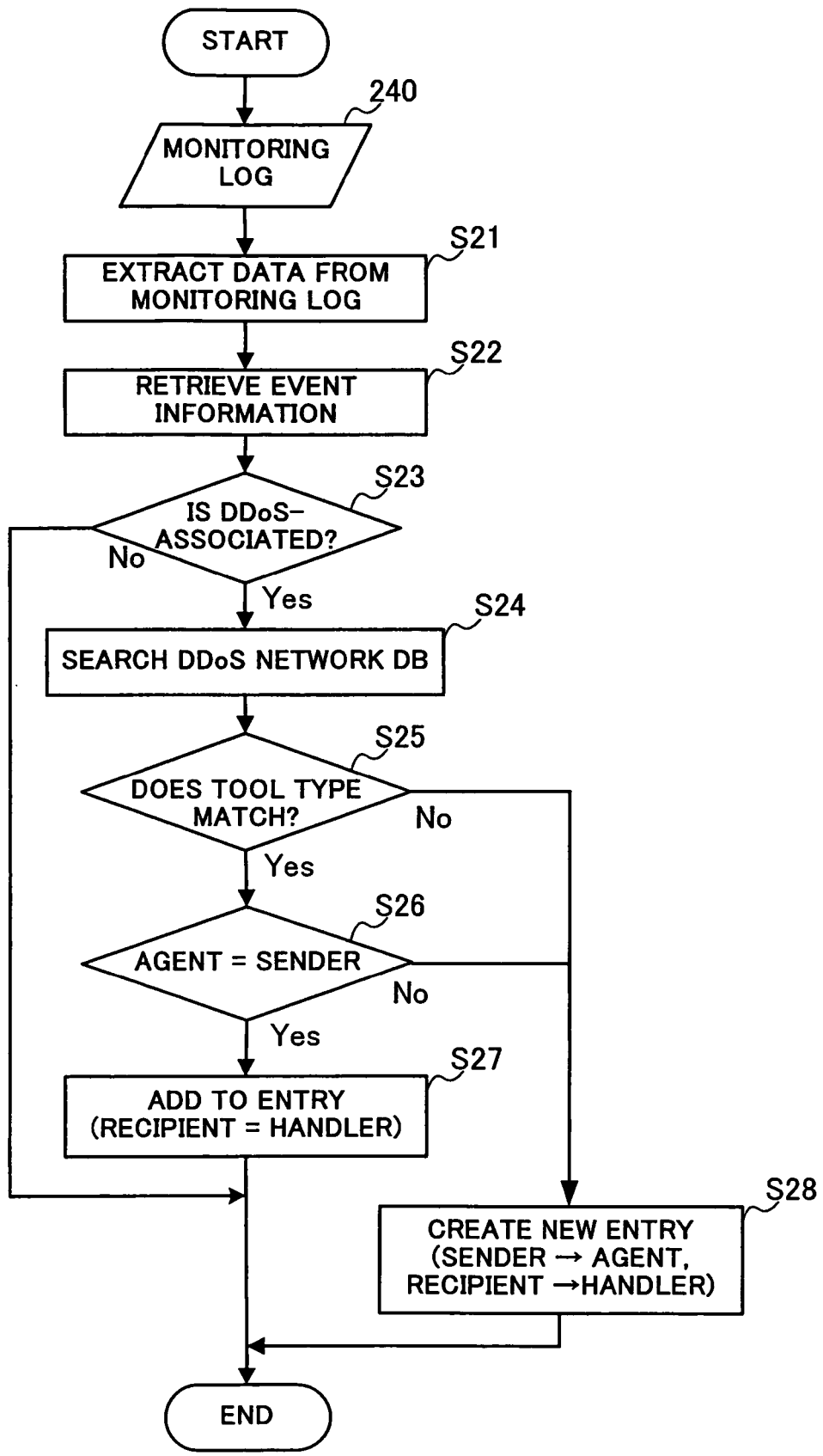
FIG. 14 is a flowchart showing a DDoS network-detecting process using information on an agent as a key.

Next, a description will be given of the case where a DDoS network is detected using an agent as a key. FIG. 14 is a flowchart showing a DDoS network-detecting process using an agent as a key.

[Step S21] Data of "detected event name", "sender", and "recipient" are extracted from a record of the monitoring log 240.

[Step S22] The event information DB 310 is searched using "detected event name" extracted in the step S21 as a key, and corresponding event information is extracted. As a result, "tool type", "role of recipient", and "associating key" are acquired.

[Step S23] It is determined whether or not "event information" is associated with the DDoS attack. More specifically, it is determined whether or not corresponding event information has been detected by the search in the step S22. If the event information exists in the event information DB 310, it is DDoS attack-associated information, whereas if the event information does not exist in the event information DB 310, the detected event is not associated with the DDoS attack, and hence the process is immediately terminated.

[Step S24] Since "event information" is associated with the DDoS attack, the DDoS network DB 320 storing DDoS networks (preparation therefor) currently underway is searched using "tool information" of extracted "event information" as a key.

[Step S25] It is determined whether or not a DDoS network having an entry of the same "tool type" exists in the DDoS network DB 320. If such a DDoS network is not detected, the process proceeds to a step S28.

[Step S26] Since the entry of the same "tool type" has been detected in the DDoS network DB 320, the "agent" entered along with the entry of the "tool type" is compared with the sender recorded in the record of the monitoring log, whereby it is determined whether or not they are the same. If they are not the same, the process proceeds to the step S28.

[Step S27] In the detected entry (identical in "tool type" and "agent") of the DDoS network, "recipient" is added to "handler", followed by terminating the present process.

[Step S28] When no entry of a DDoS network (identical in "tool type" and "agent") has been detected, a new entry of the DDoS network is created to register the "sender" as the "agent", and the "recipient" as the "handler", followed by terminating the present process.

By performing the above DDoS network-detecting process, a DDoS network is detected from the monitoring log recording events which mainly occur in the installation stage and of which the sender is an agent and each recipient is a handler.

In an actual process for detecting a DDoS network, it is desirable that all the processes described above are carried out so as to detect a DDoS network irrespective of the stage of progress of a DDoS attack. In this case, it is possible to perform the above-described processes in the mentioned order. Further, in this case, respective parts of the processes up to the step S05, the step S15, and the step S25 may be carried out as a common part of the combined process, and before execution of the step S06, the step S16, or the step S26, for example, an associating key defined by event information may be consulted so as to branch the common part to one of these steps according to the role designated by an associating key.

By performing the DDoS network-detecting operations described above, it is possible to detect a DDoS network from a monitoring log which has recorded therein events in a preparatory stage of a DDoS attack before it reaches its predetermined stage (attack), and thereby grasp the whole aspect of a DDoS network for the DDoS attack. The whole aspect of the DDoS network can thus be grasped before the predetermined stage (attack) of the DDoS attack, using the monitoring log which records events occurring before execution of the attack. This makes it possible to predict the scale of the DDoS attack and that of damage caused by the attack so as to take an effective countermeasure against the DDoS attack.

Second Embodiment

Next, a description will be given of a second embodiment of the present invention. The second embodiment predicts the scale of an attack to be executed by a malicious network (DDoS network) detected by the first embodiment, or the scale of damage to be caused by the attack from the malicious network.

Figure 15:
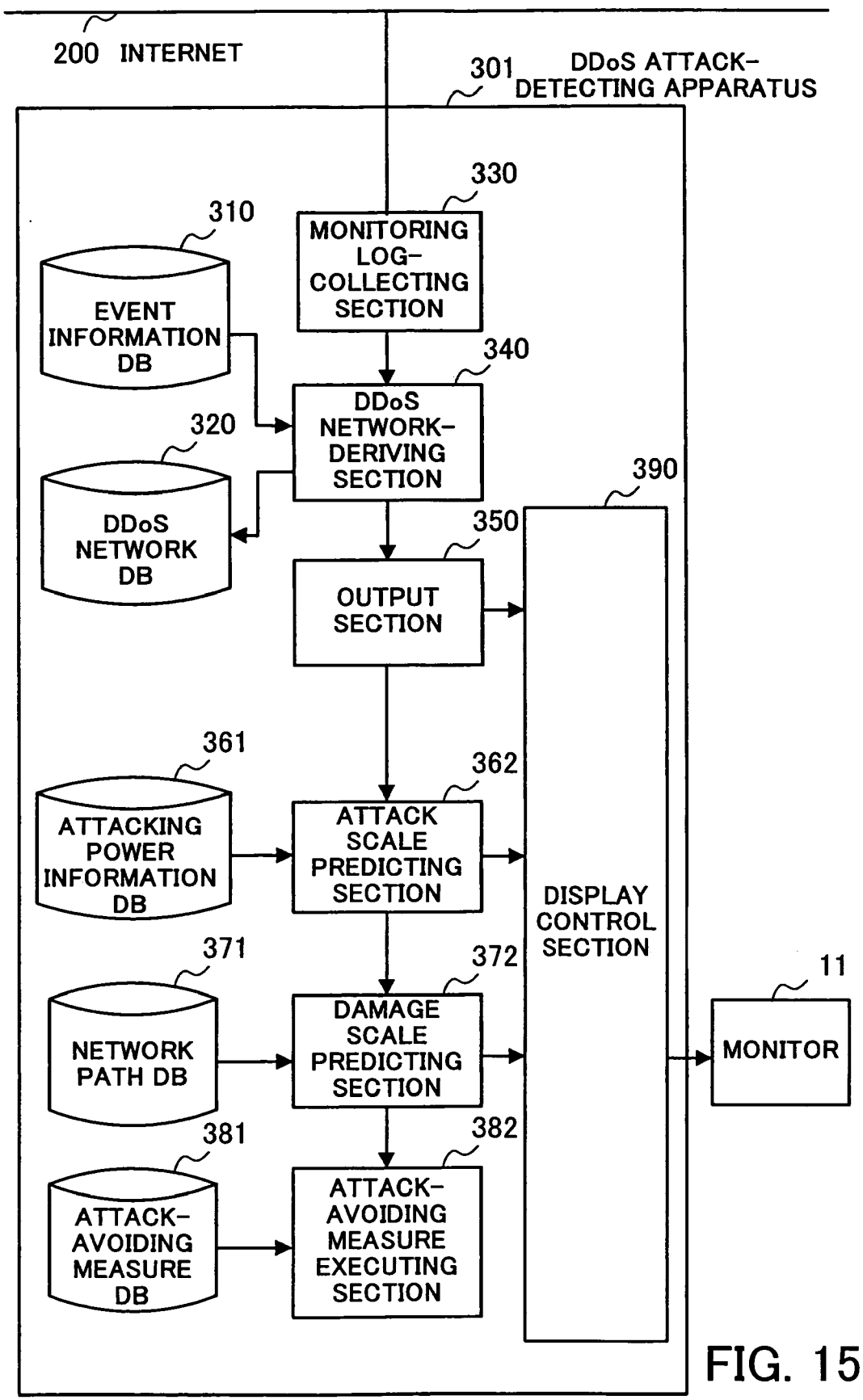
FIG. 15 is a block diagram showing the internal configuration of a DDoS attack-detecting apparatus according to a second embodiment of the present invention.

FIG. 15 is a block diagram showing the internal configuration of a DDoS attack-detecting apparatus according to the second embodiment. It should be noted that component elements identical to those shown in FIG. 5 are designated by identical reference numerals, and description thereof is omitted.

The DDoS attack-detecting apparatus 301 according to the present invention is comprised of an event information DB 310, a DDoS network DB 320, a monitoring log-collecting section 330, a DDoS network-deriving section 340, an output section 350, an attacking power information DB 361, a scale-of-attack predicting section 362, a network path DB 371, a scale-of-damage predicting section 372, an attack-avoiding measure DB 381, an attack-avoiding measure executing section 382, and a display control section 390.

The attacking power information DB 361 stores information on an attacking power in a state associated with the type of a DDoS attack tool and the type of an attack. A network bandwidth that can be wasted by an agent is set as the attacking power.

The scale-of-attack predicting section 362 predicts the scale of an attack to be carried out by the agents of a DDoS network detected by the DDoS network-deriving section 340.

The network path DB 371 stores network path information on network paths (topology), the bandwidth of each path, and so forth.

The scale-of-damage predicting section 372 predicts the scale of damage to an arbitrary node on a network. More specifically, the scale-of-damage predicting section 372 predicts the scale of damage caused by an attack on an arbitrary node, by taking into account the bandwidth and topology of network paths from agents to the arbitrary node. It should be noted that the arbitrary node can include a plurality of nodes.

Further, as a result of prediction of the scale of damage, graphics display data is prepared using the network path information, and displayed on the monitor 11 via the display control section 390.

The attack-avoiding measure DB 381 stores processes for executing attack-avoiding measures which are suited to respective combinations of types of DDoS network, scales of attack, scales of damage, and so forth.

The attack-avoiding measure executing section 382 determines a grade of the scale of damage predicted by the scale-of-damage predicting section 372, and executes a process as an attack-avoiding measure, which is retrieved from the attack-avoiding measure DB 381.

Now, a description will be given of the operation of the DDoS attack-detecting apparatus 301.

FIG. 16 is a diagram showing an example of the data structure of data stored in the attacking power information DB 361. The attacking power information DB 361 stores the types of attacks executed by tools, and attacking powers of the tools, in a state associated with each other, on a tool type-by-tool type basis. The attacking power is defined by a network bandwidth that can be wasted by an agent.

It should be noted that in FIG. 16, wasted bandwidths are defined according not only to each tool type but also to each attack type. This is because some tools can cause several types of attacks by configuration thereof.

The scale-of-attack predicting section 362 predicts the scale of attack simultaneously carried out by the agents of a DDoS network derived by the DDoS network-deriving section 340. The scale of attack is basically predicted by multiplying a network bandwidth that can be wasted by a single agent by the number of agents belonging to the DDoS network. The network bandwidth that can be wasted is obtained by searching the attacking power information DB 361 using a tool type as the key. It should be noted that when there are several attack types, the attack type for use is determined based on the progress stage of a DDoS attack by the DDoS network. As described above, the progress of a DDoS attack can be expressed as a scenario. Therefore, the scenario of the attack is prepared in advance, and compared with each record of a monitoring log, whereby a stage of progress of the DDoS attack and a scenario according to which operations of the attack are performed are determined. Such an analysis makes it possible to predict the type of attack to be executed in the future. The result of the prediction as to the scale of the attack is delivered as an output report. Further, the result of the prediction may be displayed on the monitor 11 via the display control section 390.

Furthermore, the scale of damage to the network is predicted based on the scale of the attack predicted through the process described above.

Figure 17:
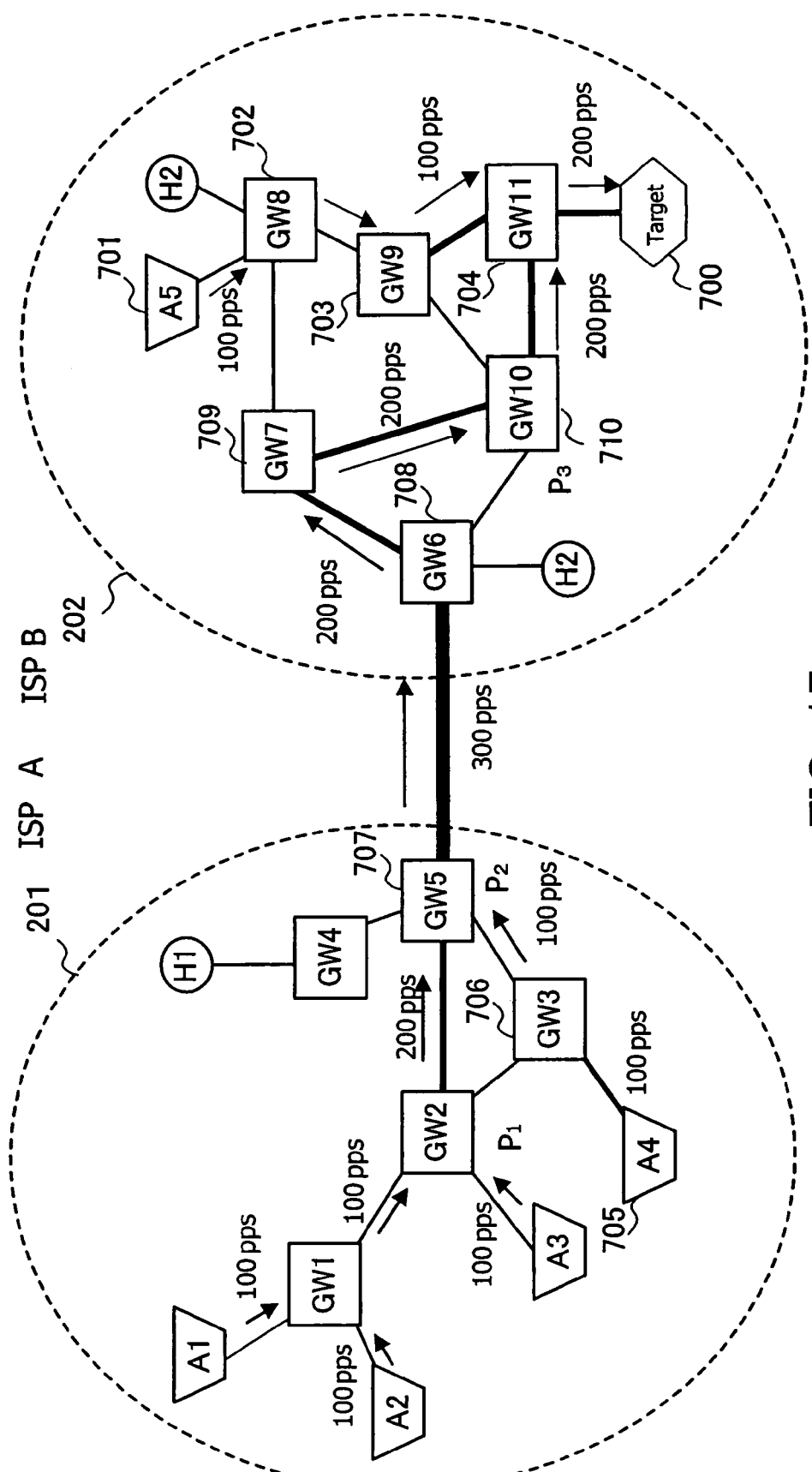
FIG. 17 is a diagram showing an example of an Internet map defined by a network path DB.

Next, a description will be given of a scale-of-damage predicting process. FIG. 17 is a diagram showing an example of an Internet map defined by the network path DB. The Internet map shows information on the topology (shape) and bandwidths of the entire Internet. For example, when attention is paid to a node GW5 on the network, paths extend from the node GW5 to nodes GW2, GW3, and GW6, which have respective bandwidths of 200 pps (packets per second), 100 pps, and 300 pps. In the actual network link DB 371, data items are associated such that using any arbitrary node as a key, paths to the node and bandwidths of the paths can be retrieved from the network link DB 371.

In the illustrated example, packets transmitted from an agent A5(701) within an ISP B(202) to a target 700 within the same ISP are transmitted via a path through nodes GW8(702), GW9(703), and GW11(704). On the other hand, packets transmitted to the target 700 from an agent A4(705) within an ISP A(201) different from the ISP B(202) passes through the nodes GW3(706), GW5(707), GW6(708), GW7(709), GW10(710), and GW11(704). For this reason, even when the bandwidth that can be wasted by the agent A4(705) is high, the maximum value thereof is limited by the bandwidth (100 pps) of a link in the path.

As described above, the calculation of the scale of damage to a certain node (wasted bandwidth) is carried out by taking into account an attacking power per each agent, the maximum value of the bandwidth of a path from the agent to the node, and so forth. By taking the topology and bandwidth of a network into account, it is possible to grasp the scale of damage which cannot be predicted from the scale of attack alone.

Although it is actually difficult for an individual or an organization to have a map of the entire Internet, it is possible to obtain the bandwidth of a network or paths between an arbitrary node and agents within a predetermined range, e.g. within an ISP. This makes it possible to predict the scale of damage.

Further, it is possible to envisage a method of predicting the scale of damage through cooperation between ISPs. Actually, it is not practical to teach the internal map of an ISP managed by an administrator to an administrator of another ISP, but it is considered that a maximum attacking power applied by his own ISP to the other can be taught. If an administrator knows the maximum values of attacking powers to be exhibited when an attack is performed via respective other ISPs, it is possible to predict the scale of damage which is to occur within his own ISP.

Figure 18:
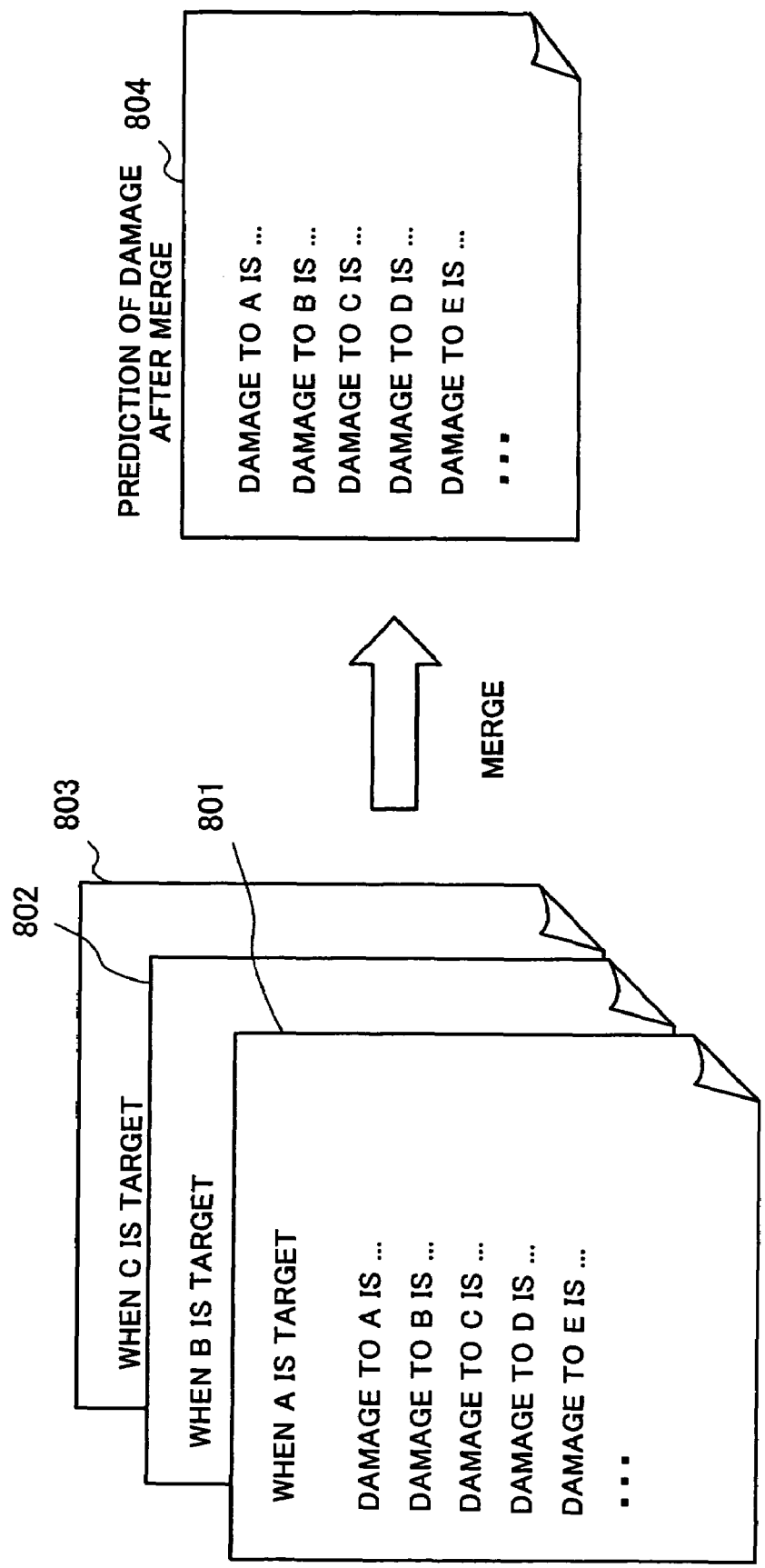
FIG. 18 is a diagram showing an example of merging of predictions of damage.

Furthermore, by determining and merging predicted values of damage to a plurality of arbitrary nodes, it is also possible to obtain a distribution of damage. FIG. 18 is a diagram showing an example of a merge of predicted values of damage. Alphabetic letters A, B, C, . . . , represent arbitrary nodes on a network.

Assuming that each of the above nodes A, B, and C is a target of an attack, the scales of damage to the node itself and the other nodes are calculated. As a result, it is possible to obtain reports on the scales of damage to a plurality of target nodes, such as a report 801 on damage to A, B, C, D, E, . . . in the case of A being a target node, a report 802 on damage to A, B, C, D, E, . . . in the case of B being a target node, and a report 803 as to damage to A, B, C, D, E, . . . in the case of C being a target node. If the contents of these reports are added or merged, by assigning weights to the targets, it is possible to obtain a report 804 on the ultimate prediction of scale of damage.

Figure 19:
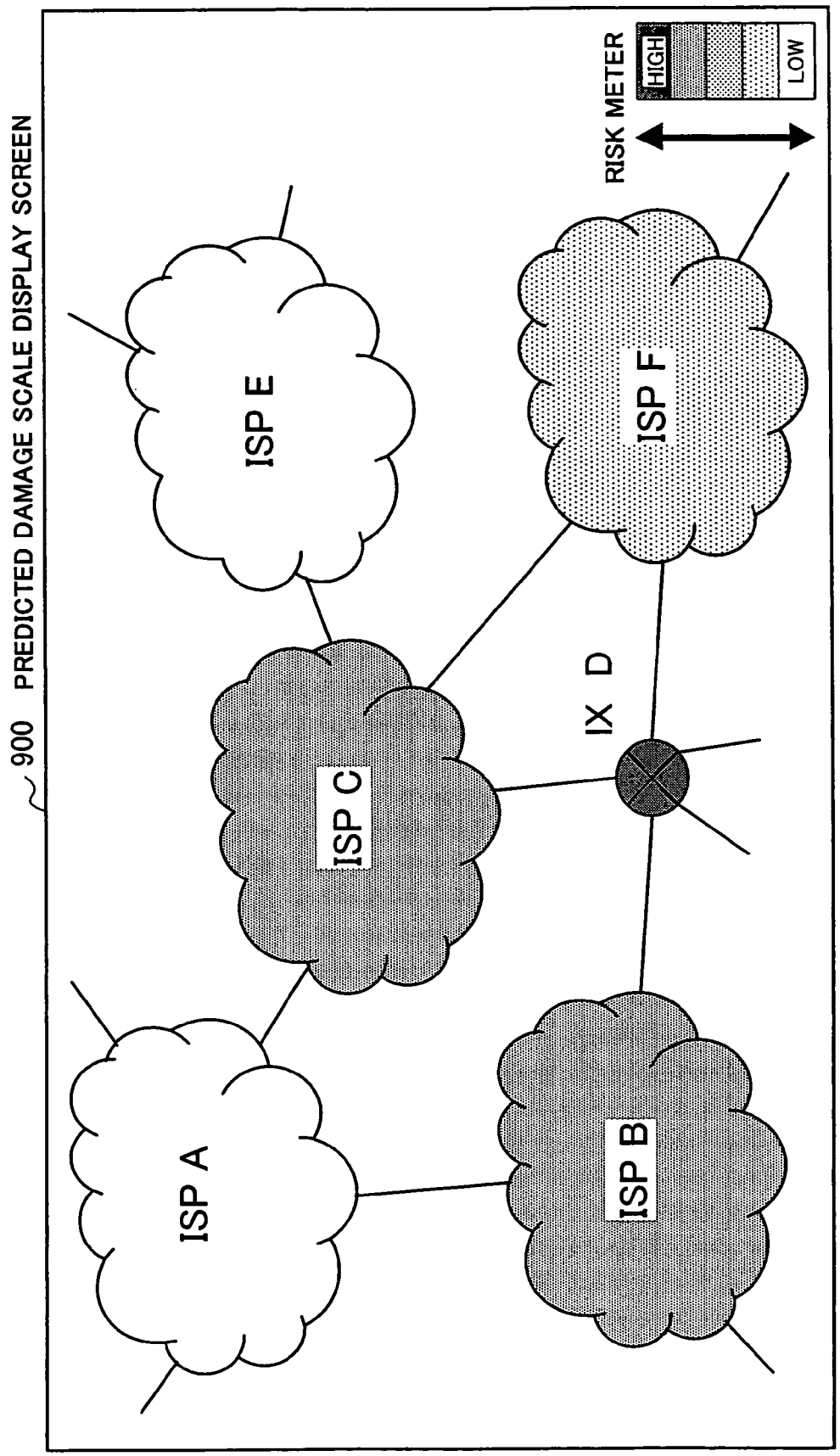
FIG. 19 is a diagram showing an example of a display screen displaying predicted scales of damage.

FIG. 19 is a diagram showing an example of the display screen showing a prediction of the scale of damage.

The predictions of the scale of damage calculated by the above operations are compiled to calculate a scale of damage to each of ISPs and IXes. Then, the monitor 11 displays a network configuration diagram showing the ISPs and IXes in association with a network map stored in the network path DB 371.

The ISPs and IXes on the network paths are displayed on a display screen 900 displaying predicted scales of damage in a bit map form. Further, the ISPs and IXes are displayed in different colors depending on the risk commensurate with the predicted scale of damage. The display screen configured as above makes it possible to easily grasp the risks of the DDoS attack.

Next, a description will be given of a process for executing an attack-avoiding measure.

The attack-avoiding measure DB 381 stores the processes for executing attack-avoiding measures which are suited to a combination of the types of DDoS network, the scales of attack, the scales of damage, and so forth, in association with the grades of the scale of damage. For example, when the scale of damage is small, a process is set e.g. for notifying the administrators of hosts (management hosts) which have been compromised to be used as agents or handlers which are to attempt an attack, of the fact. Further, when the scale of damage is predicted to be serious, a process is set for blocking the paths to the target for a predetermined time period.

The attack-avoiding measure executing section 382 determines a grade of the scale of damage predicted by the scale-of-damage predicting section 372, and retrieves a corresponding one of the processes for executing attack-avoiding measures, from the attack-avoiding measure DB 381 using the determined grade as the key. Then, the attack-avoiding measure executing section 382 carries out the retrieved process for executing the attack-avoiding measure.

It should be noted that the processing functions described above can be realized by a computer. To this end, there is provided a program describing the details of processing of the functions which the malicious access-detecting apparatus, and the DDoS attack-detecting apparatus should have. By executing the program on the computer, the processing functions described above are realized on the computer. The program describing the details of processing can be recorded in a computer-readable recording medium. The computer-readable recording medium includes a magnetic recording device, an optical disk, a magneto-optical recording medium, and a semiconductor memory. The magnetic recording device includes a hard disk drive (HDD), a flexible disk (FD), and a magnetic tape. The optical disk includes a DVD (Digital Versatile Disk), a DVD-RAM, and a CD-ROM (Compact Disk Read Only Memory), and a CD-R (Recordable)/RW (ReWritable). Further, the magneto-optical recording medium includes an MO (Magneto-Optical disk).

To make the program available on the market, portable recording media, such as DVD and CD-ROM, which store the program, are sold. Further, the program can be stored in a storage device of a server computer connected to a network, and transferred from the server computer to another computer via the network.

When the program is executed by a computer, the program stored e.g. in a portable recording medium or transferred from the server computer is stored into a storage device of the computer. Then, the computer reads the program from the storage device of its own and executes processing based on the program. The computer can also read the program directly from the portable recording medium and execute processing based on the program. Further, the computer may also execute processing based on a program which is transferred from the server computer whenever the processing is to be carried out.

As described above, according to the present invention, groups of malicious apparatuses (malicious apparatus groups) involved in the preparation of a predetermined type of malicious access are derived from monitoring information on a network, and a list of the malicious apparatus groups (apparatuses thereof) is formed. This makes it possible to grasp the whole aspect of each malicious access which threatens an attack in the future.

Further, according to the present invention, malicious apparatus groups each constituting a DDoS network are derived using monitoring information on network events associated with DDoS attack, and a list of the malicious apparatus groups (apparatuses thereof) is formed. This makes it possible to grasp the whole aspect of each malicious access which threatens an attack in the future, thereby making it possible to predict the scale of the attack to be executed, and the scale of damage caused when the attack is executed.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A malicious access-detecting apparatus for detecting malicious access made via networks on which monitoring devices are provided for monitoring the networks to detect network events, comprising:
   an event information-storing section to store event information defining the network events including at least one type of network event that occurs before a specified stage of a malicious access, the event information defining roles that senders and recipients of each network event play in one of a plurality of malicious apparatus groups involved in the malicious access;
   a monitoring information-collecting section to collect monitoring information including the detected network events from the monitoring devices;
   a malicious apparatus group-deriving section to
      retrieve an associated piece of the event information from said event information-storing section by using each detected network event in the collected monitoring information as a key, the associated piece being associated with the key, and
      derive, based on the retrieved pieces of the event information, apparatuses involved in relevant detected network events as a malicious access group, the relevant detected network events belonging to the at least one type of network event and including addresses of senders or recipients that are the same as the one of the plurality of malicious access groups;
   a malicious apparatus group-storing section to store group information on the plurality of malicious access groups, the group information including the derived malicious apparatuses classified according to the roles defined in the event information; and
   an output section to output a list of the plurality malicious apparatus groups.

2. The malicious access-detecting apparatus according to claim 1, wherein said event information-storing section defines association keys, each of the association keys associates a sender and a recipient of each network event with the one of the malicious apparatus groups, and
   wherein said malicious apparatus group-deriving section extracts addresses of the sender and the recipient from the monitoring information, searches the information on the derived malicious apparatus group stored in said malicious apparatus group storing section for an address matching any of the addresses extracted from the monitoring information, and when the matching address exists, the malicious apparatus detected from the monitoring information is added to the one of the malicious apparatus groups.

3. The malicious access-detecting apparatus according to claim 1, wherein the roles of senders and recipients include attacker, handler, and agent.

4. The malicious access-detecting apparatus according to claim 1, further comprising:
   an attacking power information-storing section to store power information on attacking power to be exhibited when the specified stage of the malicious access is executed by the malicious apparatus group; and
   an attacking scale-predicting section to
      retrieve a corresponding piece of the power information on the attacking power from said attacking power information-storing section using a type of the malicious access as a key, and
      calculate a scale of the malicious access by the one of the plurality of malicious access groups using the retrieved piece of the information on the attacking power.

5. A DDoS attack-detecting apparatus for detecting a distributed denial-of-service attack made via networks including monitoring devices for monitoring the networks to detect network events, comprising:
   an event information-storing section to store event information defining the network events including at least one type of network event that occurs before a specified stage of the distributed denial-of-service attack, the event information defining roles that senders and recipients of each network event play in a malicious apparatus group involved in the distributed denial-of-service attack;
   a monitoring information-collecting section to collect monitoring information including the detected network events from the monitoring devices;
   a DDoS network-deriving section to retrieve an associated piece of the event information from said event information-storing section by using each detected network event in the collected monitoring information as a key, the associated piece being associated with the key and to derive, based on the retrieved pieces of the event information, apparatuses that are involved in relevant detected network events caused to occur by using a same type of tool for the distributed denial-of-service attack and of which addresses of senders or recipients are the same as the malicious apparatus group which constitutes a DDoS network for executing the distributed denial-of-service attack;
   a DDoS network-storing section to store information on each derived malicious apparatus group corresponding to each DDoS network, including the derived malicious apparatuses classified according to the roles defined in the event information; and
   an output section to output a list of the each derived malicious apparatus group.

6. The DDoS network-detecting apparatus according to claim 5, wherein for each piece of the monitoring information, said DDoS network-deriving section is to:
   retrieve, by using a type of the tool for the distributed denial-of-service attack as a key, with the type being determined based on the event information, one of the DDoS networks already detected using the same type of tool, from said DDoS network-storing section;
   compare an address of a sender in the monitoring information with addresses already entered in information on the detected DDoS network and classified into the same role as the role of the sender; and
   enter, when one of the addresses matches the address of the sender, the address of the recipient in the monitoring information in the information of the DDoS network to thereby update said DDoS network-storing section.

7. The DDoS attack-detecting apparatus according to claim 5, wherein the roles of senders and recipients include attacker, handler, and agent.

8. The DDoS network-detecting apparatus according to claim 5, wherein the event information stored in said event information-storing section is to define roles of the sender and the recipient of each network event, and wherein said DDoS network-deriving section is to collectively set recipients of the network events in which the role of senders is determined, based on the event information, to be an agent and at the same time the senders has the same address, as handlers, in the information on the DDoS network.

9. The DDoS attack-detecting apparatus according to claim 5, further comprising:

an attacking power information-storing section to store information on attacking power dependent on a type of tool for the distributed denial-of-service attack; and an attacking scale-predicting section to retrieve a corresponding piece of the information on the attacking power from said attacking power information-storing section, using the type of tool for the distributed denial-of-service attack, as a key, and calculating a scale of attack to occur when the DDoS network executes the attack, using the retrieved corresponding piece of the information on the attacking power.

10. The DDoS attack-detecting apparatus according to claim 9, wherein the attacking power defined by said attacking power information-storing section is a network bandwidth that can be wasted by an agent of the DDoS network, and wherein said attacking scale-predicting section is to calculate the scale of attack by calculating a number of agents belonging to the DDoS network and the network bandwidth that can be wasted by the agent.

11. The DDoS attack-detecting apparatus according to claim 9, further comprising:

a network path information-storing section to store information on network paths at least including the agents belonging to the DDoS network and an arbitrary node on the network, and bandwidths of the network paths; and damage scale-predicting section to predict a scale of damage to the arbitrary node on a network to be caused by the DDoS attack through the network paths when the DDoS attack is executed in the scale of attack calculated by said attack scale-predicting section.

12. The DDoS attack-detecting apparatus according to claim 11, wherein said damage scale-predicting section is to display scales of damage at arbitrary nodes on the network paths predicted by said attack scale-predicting section, together with the network paths obtained from said network path information-storing section, such that the scales of damage are superimposed on the network paths.

13. The DDoS attack-detecting apparatus according to claim 11, further comprising:

a attack avoidance measure information-storing section to store attack-avoiding processes for avoiding the DDoS attack, in dependence on the scale of damage; and an avoidance measure execution section to retrieve one of the attack-avoiding processes which corresponds to the scale of damage, from said attack avoidance measure information-storing section, using the scale of damage calculated by said damage scale-predicting section as a key, and executing the retrieved attack-avoiding process.

14. The DDoS attack-detecting apparatus according to claim 5, wherein the event information stored in said event information-storing section contains information on tools for causing the distributed denial-of-service attack to occur, and wherein said DDoS network-deriving section compares the senders or the recipients of the network events produced by using the same type of tool for the distributed denial-of-service attack, based on the event information.

15. A method of detecting malicious access made via networks on which monitoring devices are provided for monitoring the networks to detect network events, the method comprising:

storing, in an event information memory, event information defining the network events including at least one type of network event that occurs before a specified stage of a malicious access, the event information defining roles that senders and recipients of each network event play in one of a plurality a malicious apparatus groups involved in the malicious access;

collecting monitoring information including the detected network events, from the monitoring devices;

retrieving an associated piece of the event information, by using each detected network event in the collected monitoring information, as a key, the associated piece being associated with the key;

identifying, based on the retrieved pieces of the event information, apparatuses involved in relevant detected network events as a malicious access group, the relevant detected network event belonging to the at least one type of network event and including addresses of senders or recipients that are the same as the one of the plurality of malicious access groups;

storing, in a malicious apparatus group memory, group information on the plurality of access groups, including the identified malicious apparatuses classified according to the roles defined in the event information; and outputting a list of the plurality of malicious access groups.

16. A computer-readable storage medium encoded with a computer program that, when executed on a computer, carries out a process for detecting malicious access made via networks on which monitoring devices are provided for monitoring the networks to detect network events, the process comprising:

storing, in an event information memory, event information defining the network events including at least one predetermined type of network events that occur before a predetermined stage of a predetermined type of malicious access, the event information further defining roles that senders and recipients of each network event play in a malicious apparatus group involved in the predetermined type of malicious access;

collecting monitoring information including the detected network events, from the monitoring devices;

retrieving an associated piece of the event information from said event information-storing section, by using each detected network event in the collected monitoring information, as a key, the associated piece being associated with the key, and deriving, based on the retrieved pieces of the event information, apparatuses that are involved in relevant detected network events which belong to the predetermined type of network events and of which addresses of senders or recipients are same, as a malicious apparatus group involved in the predetermined type of malicious access;

storing, in a malicious apparatus group memory, information on each derived malicious apparatus group, including the derived malicious apparatuses classified according to the roles defined in the event information; and outputting a list of the each derived malicious apparatus group.

17. A method of detecting a distributed denial-of-service attack made via networks including monitoring devices for monitoring the networks to detect network events, the method comprising:

storing, in an event information memory, event information defining the network events including at least one predetermined type of network events that occur before a predetermined stage of the distributed denial-of-service attack, the event information further defining roles that senders and recipients of each network event play in a malicious apparatus group involved in the distributed denial-of-service attack;

collecting monitoring information including the detected network events, from the monitoring devices;

retrieving an associated piece of the event information, by using each detected network event in the collected monitoring information, as a key, the associated piece being associated with the key, and deriving, based on the retrieved pieces of the event information, apparatuses that are involved in relevant detected network events caused to occur by using a same type of tool for the distributed denial-of-service attack and of which addresses of senders or recipients are same, as a malicious apparatus group which constitutes a DDoS network for executing the distributed denial-of-service attack;

storing, in a DDoS network memory, information on each derived malicious apparatus group corresponding to each DDoS network, including the derived malicious apparatuses classified according to the roles defined in the event information; and outputting a list of the each derived malicious apparatus group.

18. A computer-readable storage medium encoded with a computer program that, when executed on a computer, carries out a process for detecting a distributed denial-of-service attack made via networks including monitoring devices for monitoring the networks to detect network events, the process comprising:

storing, in an event information memory, event information defining the network events including at least one predetermined type of network events that occur before a predetermined stage of the distributed denial-of-service attack, the event information further defining roles that senders and recipients of each network event play in a malicious apparatus group involved in the distributed denial-of-service attack;

collecting monitoring information including the detected network events, from the monitoring devices;

retrieving an associated piece of the event information from said event information-storing section, by using each detected network event in the collected monitoring information, as a key, the associated piece being associated with the key, and deriving, based on the retrieved pieces of the event information, apparatuses that are involved in relevant detected network events caused to occur by using a same type of tool for the distributed denial-of-service attack and of which addresses of senders or recipients are same, as a malicious apparatus group which constitutes a DDoS network for executing the distributed denial-of-service attack;

storing, in a DDoS network memory, information on each derived malicious apparatus group corresponding to each DDoS network, including the derived malicious apparatuses classified according to the roles defined in the event information; and outputting a list of the each derived malicious apparatus group.

* * * * *